(12) United States Patent
Park

(10) Patent No.: US 11,373,573 B2
(45) Date of Patent: Jun. 28, 2022

(54) METHOD AND DEVICE FOR COMPENSATING LUMINANCE DEVIATION

(71) Applicant: LG Display Co., Ltd., Seoul (KR)

(72) Inventor: Ji Hoon Park, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 17/220,790

(22) Filed: Apr. 1, 2021

(65) Prior Publication Data

US 2021/0312849 A1 Oct. 7, 2021

(30) Foreign Application Priority Data

Apr. 1, 2020 (KR) .................. 10-2020-0039992

(51) Int. Cl.
*G09G 3/20* (2006.01)
*G06T 7/00* (2017.01)

(52) U.S. Cl.
CPC .............. *G09G 3/20* (2013.01); *G06T 7/0004* (2013.01); *G06T 2207/30121* (2013.01); *G09G 2320/0233* (2013.01); *G09G 2320/0276* (2013.01); *G09G 2320/0673* (2013.01); *G09G 2320/0693* (2013.01); *G09G 2330/12* (2013.01); *G09G 2360/147* (2013.01)

(58) Field of Classification Search
CPC ........ G09G 3/006; G09G 3/20; G09G 3/2003; G09G 3/2007; G09G 3/2092; G09G 3/3275–3291; G09G 3/3607; G09G 3/3685–3696; G09G 2310/0243; G09G 2310/027–0275; G09G 2320/02; G09G 2320/0233; G09G 2320/0242; G09G 2320/0271; G09G 2320/0276; G09G 2320/029; G09G 2320/0295; G09G 2320/043–046; G09G 2320/066–0673; G09G 2320/0693

See application file for complete search history.

(56) References Cited

U.S. PATENT DOCUMENTS

2007/0210996 A1* 9/2007 Mizukoshi ........... G09G 3/3233
345/77
2011/0063469 A1* 3/2011 Omi ...................... H04N 5/367
348/222.1

(Continued)

FOREIGN PATENT DOCUMENTS

KR 10-2014-0082333 A 7/2014
KR 10-2015-0050244 A 5/2015

(Continued)

*Primary Examiner* — Nathan Danielsen
(74) *Attorney, Agent, or Firm* — Polsinelli PC

(57) ABSTRACT

The present disclosure relates to a method and a device for compensating for a luminance deviation, in which test pixel data is written to pixels disposed on a screen of a display panel and an image of the screen is captured, a luminance deviation is determined by analyzing luminance characteristics based on a measured luminance value of each of the pixels, which is obtained from data of the image of the screen captured by an imaging device, and a defective pixel is detected, and compensation data for reducing the luminance deviation between the pixels is derived for each pixel, so that a measured luminance value or compensation data of the defective pixel can be removed.

18 Claims, 22 Drawing Sheets

(56) References Cited

U.S. PATENT DOCUMENTS

| | | | |
|---|---|---|---|
| 2014/0184671 A1* | 7/2014 | Lee .................. | G09G 3/006 |
| | | | 345/697 |
| 2016/0203751 A1* | 7/2016 | Suginohara .......... | G09G 3/2074 |
| | | | 345/694 |
| 2020/0090565 A1* | 3/2020 | Sawahata .............. | G09G 3/006 |

FOREIGN PATENT DOCUMENTS

| | | | |
|---|---|---|---|
| KR | 10-1945225 B1 | 2/2019 | |
| KR | 10-1980755 B1 | 5/2019 | |

\* cited by examiner

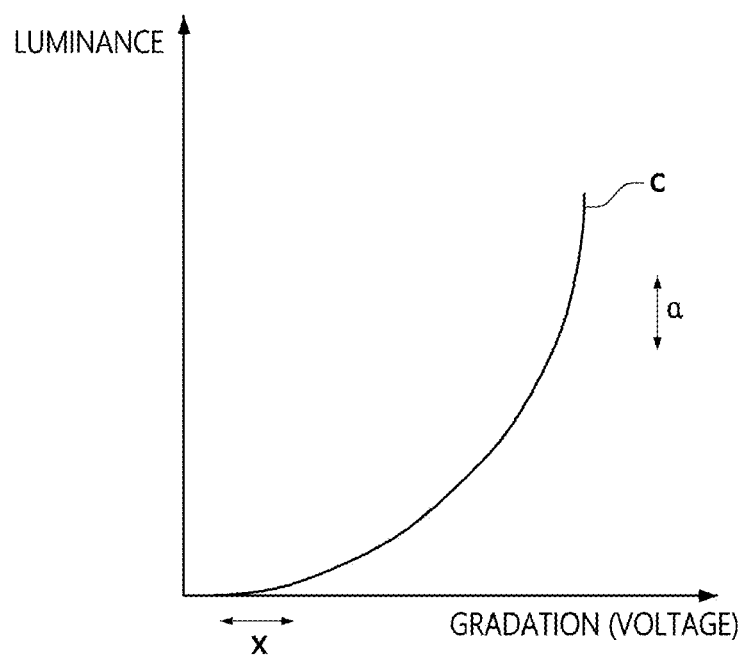

| Gain (α) | Offset (b) | Curvature (c) | DETECTION/CLASSIFICATION |
|---|---|---|---|
| OK | OK | OK | NORMAL PIXEL |
| NG | NG | OK | |
| OK | NG | OK | |
| NG | OK | OK | CONTAMINATED PIXEL |
| OK | OK | NG | BAD PIXEL |
| NG | OK | NG | |
| OK | NG | NG | |
| NG | NG | NG | |

FIG. 16
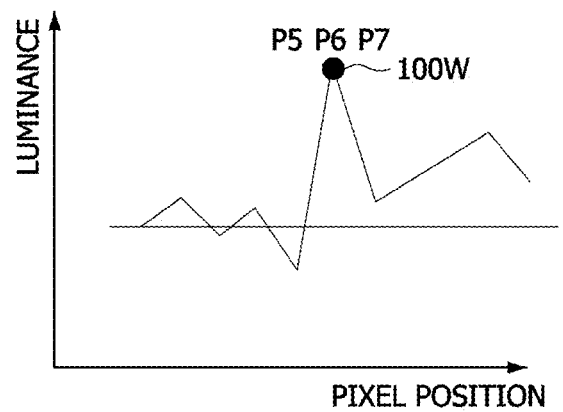
⇩ BRIGHT SPOT DETECTION
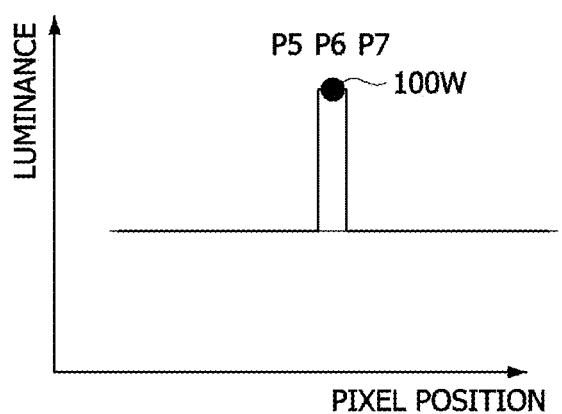
⇩ REMOVE MEASURED LUMINANCE VALUE OF BRIGHT SPOT PIXEL AND CALCULATE LUMINANCE BY INTERPOLATION METHOD
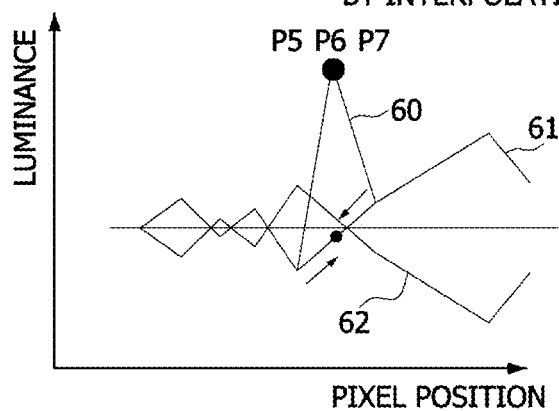

METHOD AND DEVICE FOR COMPENSATING LUMINANCE DEVIATION

CROSS REFERENCE TO RELATED APPLICATION

This application claims priority to and the benefit of Korean Patent Application No. 10-2020-0039992 filed on Apr. 1, 2020, which is incorporated herein by reference in its entirety.

BACKGROUND

Field of the Disclosure

The present disclosure relates to a method and a device for compensating for a luminance deviation that are capable of compensating for the luminance deviation by deriving compensation data based on a result of capturing an image of a screen. The present disclosure relates to a display device including a luminance deviation compensation device.

Description of the Background

An example of a method of compensating for a luminance deviation of a display device includes turning on pixels of a screen, capturing an image of the screen with a camera, analyzing the image obtained from the camera, and measuring a luminance deviation of the screen. This method may set compensation data for compensating for the luminance deviation obtained from the captured image. When pixel data of the input image is input, the display device modulates the pixel data with the preset compensation data and writes the modulated data to the pixels.

SUMMARY

There are various methods for deriving compensation data from an image obtained from a camera, but a luminance deviation could not be accurately compensated for.

The present disclosure is directed to providing a method and a device for compensating for a luminance deviation that are capable of improving image quality by quickly and accurately detecting various defectives in pixels, deriving optimal compensation data according to a defective type, and accurately compensating for a luminance deviation of a screen.

The present disclosure is also directed to providing a display device that compensates for a luminance deviation using the compensation data.

The present disclosure is not limited to the above-described features, and other features that are not described herein will be apparently understood by those skilled in the art from the following description.

According to an aspect of the present disclosure, there is provided a luminance deviation compensation method including writing test pixel data to pixels on a screen of a display panel and capturing an image of the screen, analyzing luminance characteristics based on a measured luminance value of each of the pixels, which is obtained from data of the image of the screen captured by an imaging device, to determine a luminance deviation and detecting a defective pixel, deriving compensation data for reducing the luminance deviation between the pixels for each pixel, and removing the measured luminance value or the compensation data of the defective pixel.

According to another aspect of the present disclosure, there is provided a luminance deviation compensation device including a compensation device configured to write test pixel data to pixels disposed on a screen of a display panel and capture an image of the screen using an imaging device.

The compensation device includes a defective pixel detection unit configured to determine a luminance deviation by analyzing luminance characteristics based on a measured luminance value of each of the pixels, which is obtained from image data of the screen, and detect defective pixels; and a compensation unit configured to derive compensation data for each pixel for reducing the luminance deviation between the pixels and remove a measured luminance value or compensation data of the defective pixel.

According to another aspect of the present disclosure, there is provided a luminance deviation compensation device including a compensation device configured to obtain a measured luminance value of each of pixels by capturing an image of a screen of a display panel using an imaging device, and derive compensation data for compensating for the measured luminance value for each pixel.

The compensation device is configured to write test pixel data to the pixels disposed on the screen and capture an image of the screen first, write modulated pixel data obtained by modulating the pixel data with the compensation data, which is derived based on the measured luminance value of each of the pixels measured based on the first capturing result, to the pixels, and secondly capture an image of the screen, and further reduce a luminance deviation of the pixels by updating the compensation data based on the secondary capturing result.

The compensation device includes a defective pixel detection unit configured to obtain luminance characteristics based on the measured luminance value of each of the pixels from image data of the screen output from the imaging device, and detect a defective pixel by analyzing the luminance characteristics of each of the pixels; and a compensation unit configured to derive the compensation data for each pixel, remove a measured luminance value or compensation data of the defective pixel, and interpolate the removed measured luminance value or compensation data of the defective pixel using data of neighboring pixels adjacent to the defective pixel or replace the compensation data with a preset specific value.

According to another aspect of the present disclosure, there is provided a display device including a display panel including a screen in which pixels, on which an input image is reproduced, are disposed; a memory in which compensation data, which is derived as a result of capturing an image of the screen by a luminance deviation compensation device, is stored; a pixel driving unit configured to add the compensation data to pixel data of the input image and write the pixel data to the pixels; and a luminance deviation compensation device configured to determine a luminance deviation by analyzing luminance characteristics based on a measured luminance value of each of the pixels, which is obtained from image data of the screen, and detect a defective pixel, derive compensation data for each pixel for reducing the luminance deviation between the pixels, remove a measured luminance value or compensation data of the defective pixel, and interpolate the removed measured luminance value or compensation data by an interpolation method using the defective pixel, or replace the compensation data with a specific value.

The display device further includes a pixel driving circuit configured to modulate pixel data of an input image using the compensation data stored in the memory.

BRIEF DESCRIPTION OF THE DRAWINGS

The above and other features and advantages of the present disclosure will become more apparent to those of ordinary skill in the art by describing exemplary aspects thereof in detail with reference to the accompanying drawings, in which:

FIG. 6 is a graph illustrating luminance characteristics of normal pixels based on a gamma curve;

FIG. 16 is a diagram illustrating a luminance deviation compensation effect obtained by removing a measured luminance value of a bright spot pixel;

DETAILED DESCRIPTION

Figure 1:
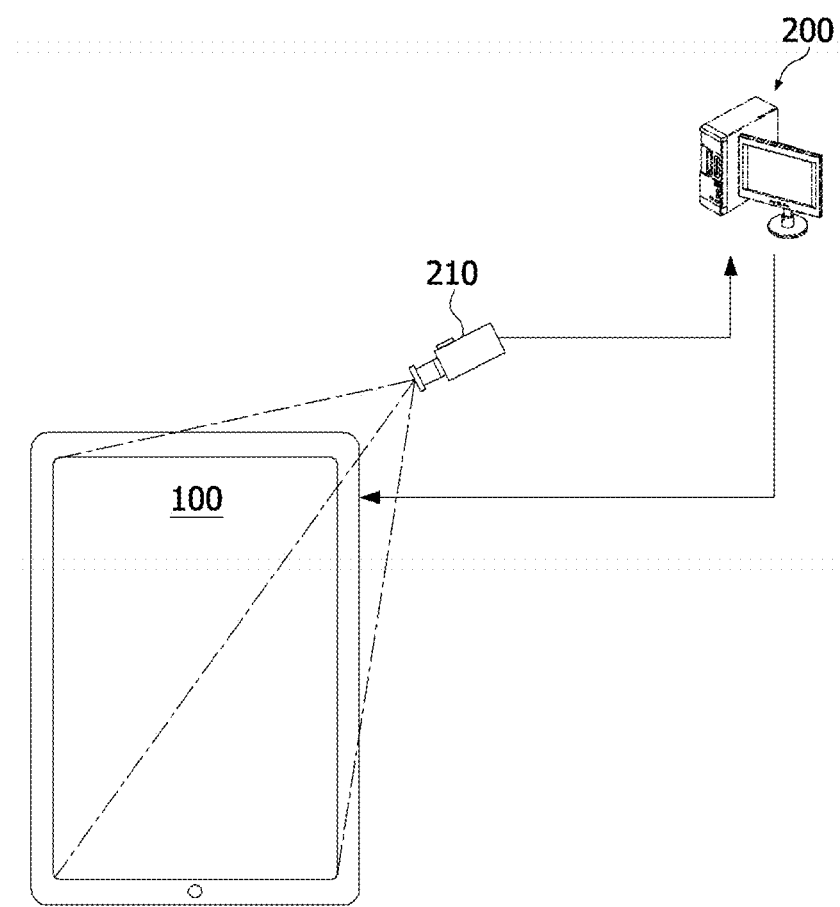
FIGS. 1 and 2 are diagrams illustrating a luminance deviation compensation device according to an aspect of the present disclosure.

Advantages and features of the present disclosure, and implementation methods thereof will be clarified through the following aspects described with reference to the accompanying drawings. However, the present disclosure is not limited to aspects disclosed herein and may be implemented in various different forms. The aspects are provided for making the disclosure of the prevention disclosure thorough and for fully conveying the scope of the present disclosure to those skilled in the art. It is to be noted that the scope of the present disclosure is defined by the claims.

The figures, dimensions, ratios, angles, numbers, and the like disclosed in the drawings for describing the aspects of the present disclosure are merely illustrative and are not limited to matters shown in the present disclosure. Like reference numerals refer to like elements throughout. Further, in describing the present disclosure, detailed descriptions of well-known technologies will be omitted when it is determined that they may unnecessarily obscure the gist of the present disclosure.

Terms such as "including" and "having" used herein are intended to allow other elements to be added unless the terms are used with the term "only." Any references to singular may include plural unless expressly stated otherwise.

Components are interpreted to include an ordinary error range even if not expressly stated.

For description of a positional relationship, for example, when the positional relationship between two parts is described as "on," "above," "below," "next to," and the like, one or more parts may be interposed therebetween unless the term "immediately" or "directly" is used in the expression.

While terms, such as "first", "second", etc., may be used to describe various components, such components must not be limited by the above terms. The above terms are used only to distinguish one component from another.

For description of a temporal relationship, for example, when a temporal relationship is described as "after," "subsequently to," "next," "before," and the like, a non-consecutive case may be included unless the term "immediately" or "directly" is used in the expression.

The features of various aspects of the present disclosure may be partially or entirely bonded to or combined with each other. The aspects may be interoperated and performed in technically various ways and may be carried out independently of or in association with each other.

According to the present disclosure, in an inspection process before shipment of display device products, an image of a screen is captured with an imaging device such as a camera to analyze a luminance deviation of pixels, and based on the analysis result, a compensation value (hereinafter referred to as "compensation data") is derived for each pixel to compensate for a luminance deviation of the screen. The compensation data may be derived for each subpixel.

Figure 2:
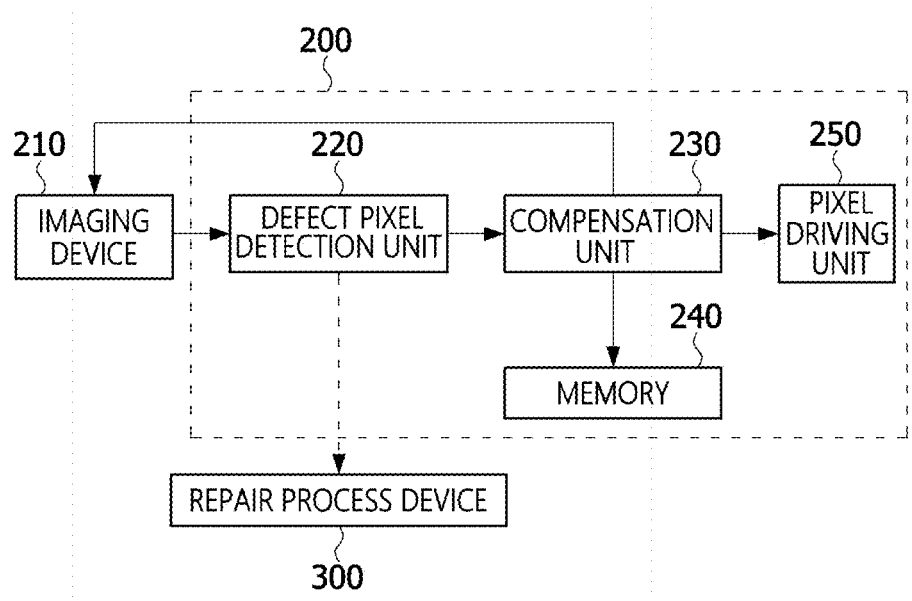

Referring to FIGS. 1 and 2, the luminance deviation compensation device includes an imaging device 210 and a compensation device 200.

The imaging device 210 is disposed to face a screen of a display panel 100 and is driven by the compensation device 200 for luminance characteristics. The imaging device 210 transmits image data obtained by capturing an image of the screen to the compensation device 200. A camera may support a high dynamic range (HDR), but the present disclosure is not limited thereto.

The imaging device 210 transmits image data before compensation, which is obtained by capturing an image of the screen of the display panel 100 in which test pixel data before compensation is written to pixels, to a defective pixel detection unit 220 under the control of the compensation device 200. The imaging device 210 may transmit image data after compensation, which is obtained by capturing an image of the screen of the display panel 100 to which the compensation data is applied after compensation, to the defective pixel detection unit 220. The imaging device 210 may be driven by the compensation device 200.

As shown in FIG. 2, the compensation device 200 includes the defective pixel detection unit 220, a compensation unit 230, a memory 240, and a pixel driving unit 250.

The compensation device 200 transmits test pixel data for measuring luminance of the pixels to the pixel driving unit 250 and transmits an enable signal to the imaging device 210 to drive the imaging device 210. The test pixel data is data with the same gradation value and is written to all the pixels. In the case of an ideal screen without a luminance deviation, when the test pixel data is written to all the pixels, a luminance deviation may not occur. On the other hand, in the case of a screen in which defective pixels are present, when the test pixel data is written to all the pixels, a luminance deviation between the pixels is measured, and in a severe case, a foreign matter mark, a stain, or line dimming may be seen.

The pixel driving unit 250 writes the test pixel data received from the compensation device 200 to the pixels of the display panel 100. At this point, the same gradation voltage or current is applied to the pixels. The pixel data may be transmitted to the pixel driving unit 250 after being converted into a data voltage or a current value.

The pixel driving unit 250 may be a driver integrated circuit (IC) connected to signal lines of the display panel or a test jig configured to apply a signal to the signal lines through a probe. The signal lines of the display panel include data lines through which the data voltage is applied and gate lines through which a gate signal (or scan signal) is applied.

The defective pixel detection unit 220 receives the image data input from the imaging device 210 and analyzes luminance (hereinafter, referred to as a "measured luminance value") of the screen with a preset algorithm to determine luminance characteristics of each of the pixels and the luminance deviation between the pixels. The luminance characteristics of the pixels may include an offset, a gain (or slope), and a curvature of a gamma curve as in FIGS. 6 to 7C.

The defective pixel detection unit 220 detects defective pixels based on the luminance deviation between the pixels, which is obtained from a measured luminance value that is obtained from the imaging device 210.

Normal pixels include pixels whose luminance deviation is less than a preset allowable range and pixels whose luminance characteristics may be compensated for to be within an allowable range after the compensation data is applied. The latter pixels may be pixels that appear as spots (or mura) before compensation due to a large luminance deviation from neighboring pixels or may be pixels whose luminance deviation is reduced after compensation so that a luminance difference from the neighboring pixels is not visible. At least one of an offset, a gain, and a curvature defining the luminance characteristics of the normal pixels may be set to an allowable range between an upper threshold value and a lower threshold value.

The defective pixels include failed pixels and contaminated pixels. The failed pixels include pixels (hereinafter referred to as "bright spot pixels") that appear as bright spots whose luminance is fixed regardless of gradation of the pixel data, and pixels (hereinafter referred to as "dark spot pixels") that appear as dark spots regardless of the gradation of the pixel data.

As an example, the contaminated pixels may be pixels contaminated by fine foreign matter mixed in during a manufacturing process. As another example, the contaminated pixels may be pixels located in marks, on a protective film covering the screen of the display panel, which are generated by being contaminated by foreign matter or scratched. The display panel may be transferred in a state in which the protective film is adhered on the screen. Since the protective film is exposed, the protective film may be contaminated by foreign matter or scratched on a surface thereof.

The defective pixel detection unit 220 transmits coordinate information indicating positions of the defective pixels together with luminance deviation information of the pixels to the compensation unit 230.

The defective pixel detection unit 220 may transmit coordinate information of the failed pixels, whose luminance characteristics may not be compensated for by the compensation data, to a repair process device 300 together with an identification code of the display panel. Accordingly, when a failed pixel, which may not be compensated for due to a physical defective, is detected, coordinate information on the failed pixel is directly transmitted to the repair process device 300 so that a repair process may be efficiently performed.

The repair process may select a repair method according to the type of the failed pixel. Bright spot defectives have a worse effect on image quality than dark spot defectives. The repair process device 300 may cut a signal line of a bright spot defective pixel and a node of a switching element by irradiating a laser beam thereon to cause the bright spot defective to become a dark spot.

The compensation unit 230 removes the measured luminance value of the defective pixel and derives compensation data for compensating for a luminance deviation of the normal pixels for each pixel. The compensation data may be determined as a compensation value that inversely compensates for the measured luminance value of the pixels. In the case of bright pixels whose luminance is higher than the allowable range, the compensation data may be set to a negative compensation value in order to lower the luminance. As the luminance of the bright pixel increases, the negative compensation value is set to a lower value. In the case of dark spot pixels whose luminance is lower than the allowable range, the compensation data may be set to a positive compensation value in order to increase the luminance. As the luminance of the dark spot pixel decreases, the positive compensation value is set to a higher value.

When the luminance deviation of the pixels is compensated for in a state in which the measured luminance value of the defective pixels is not removed, the luminance of the normal pixels may be incorrectly compensated for due to abnormal luminance of the defective pixels. In order to prevent such side effects, a luminance value of the defective pixel after the measured luminance value of the defective pixels is removed may be calculated by an interpolation method using measured luminance values of the normal pixels (hereinafter, referred to as "neighboring pixels") adjacent to the defective pixel. Any method known in the art is applicable to the interpolation method. For example, the compensation unit 230 may replace the luminance value of the defective pixels with a value calculated by an interpolation algorithm such as inpainting or hole-filling using the measured luminance value of the neighboring pixels adjacent to the defective pixel.

In another aspect, after the compensation data is derived for each pixel based on the measured luminance value of the normal pixels and luminance pixels, the compensation unit 230 may remove the compensation data of the defective pixels. Compensation data of the failed pixel among the defective pixels may be calculated by an interpolation method using the compensation data of the neighboring pixels or may be replaced with a preset specific value, for example, "0." Compensation data of the contaminated pixel may be generated by an interpolation method using the compensation data of the neighboring pixels.

The compensation unit 230 stores the compensation data of each of the pixels in the memory 240.

In order to measure the luminance to which the compensation data derived from each of the pixels is applied, the compensation unit 230 adds the compensation data to the test pixel data for each pixel and transmits the test pixel data to the pixel driving unit 250. The pixel driving unit 250 writes the pixel data in which the compensation data is added to the pixels of the display panel 100.

The imaging device 210 is driven under the control of the compensation unit 230 to re-capture an image of the screen having a luminance deviation reduced by the compensation data, and transmits data of the secondly captured image to the defective pixel detection unit 220.

The pixel driving unit 250 determines whether a defective pixel exists from the data of the image captured after compensation, and when the defective pixel is detected, the pixel driving unit 250 transmits the luminance deviation information of the pixels to the compensation unit 230 together with coordinate information of the defective pixel. The compensation unit 230 derives compensation data of the normal pixels from the secondly captured image and removes the measured luminance value or compensation data of the failed pixel when the defective pixel is detected. The compensation unit 230 may generate a luminance value of the failed pixel by an interpolation method using measured luminance values of the neighboring pixels or may replace the luminance value of the failed pixel with a preset specific value, for example, zero. The compensation unit 230 may generate a luminance value of the contaminated pixel by an interpolation method using measured luminance values of the neighboring pixels.

In another aspect, after removing the compensation data of the failed pixel, the compensation unit 230 may calculate the compensation data of the failed pixel by the interpolation method using the compensation data of the neighboring pixels of the failed pixel or determine the compensation data as zero.

A luminance deviation compensation method according to various aspects of the present disclosure will be described with reference to FIGS. 3 to 5.

Figure 3:
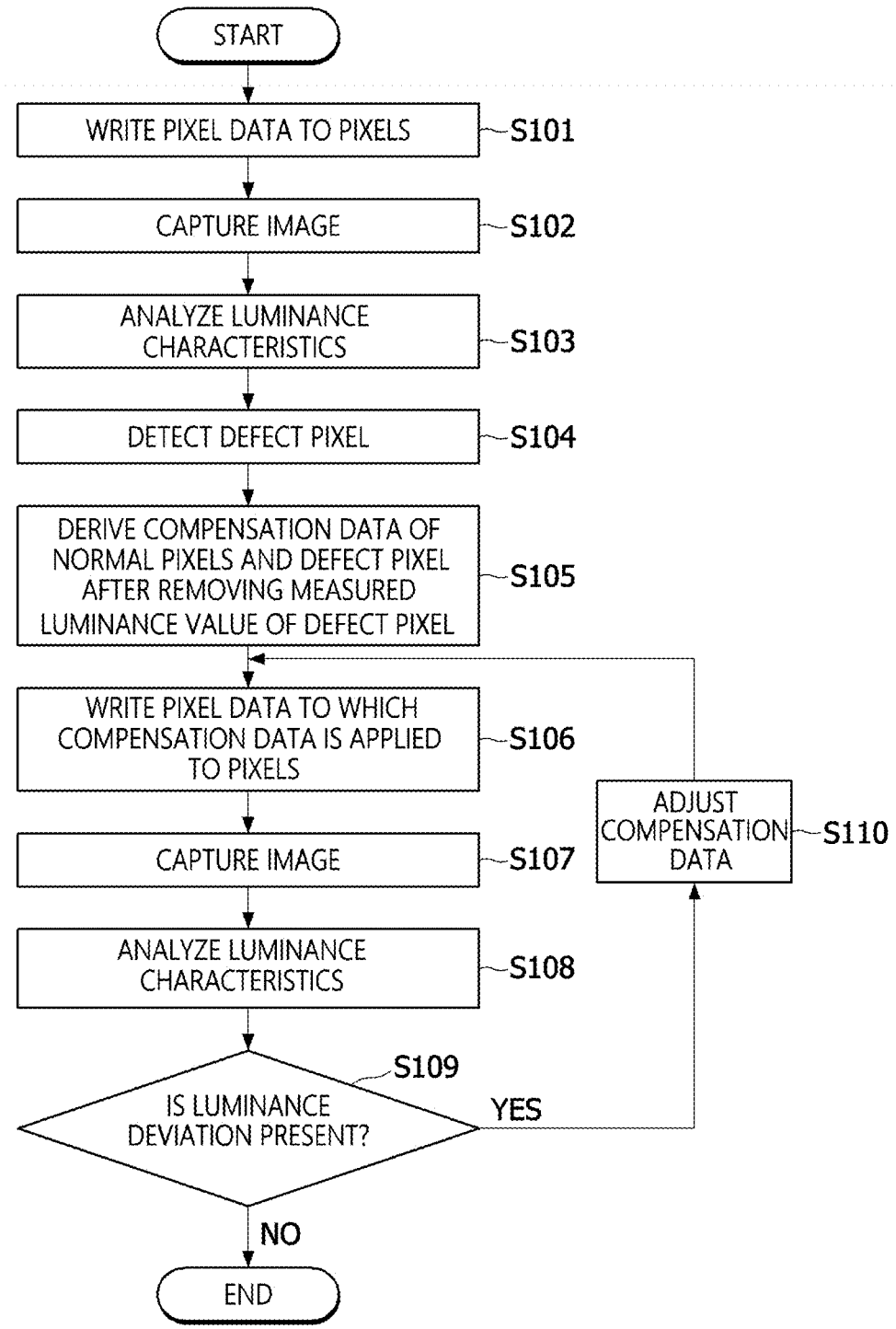
FIG. 3 is a flowchart illustrating a luminance deviation compensation method according to a first aspect of the present disclosure.

FIG. 3 is a flowchart illustrating a luminance deviation compensation method according to a first aspect of the present disclosure.

Referring to FIG. 3, a luminance deviation compensation device writes pixel data having a preset gradation value to pixels of a display panel in order to write the same gradation to the pixels and captures an image of a screen (S101 and S102). Here, a gradation value of the pixel data is applied to all the pixels with the same value. The gradation value applied in operation S101 may be a specific gradation value, for example, a gradation value 32 (32G), but the present disclosure is not limited thereto. In order to determine an offset, a gain, and a curvature of luminance characteristics, when the image is captured first, gradation of the pixel data is changed two times or more as shown in FIG. 4, and the image of the screen may be captured in each gradation.

The luminance deviation compensation device analyzes the luminance characteristics of each of the pixels obtained from data of the captured image to determine a luminance deviation between the pixels (S103). The luminance deviation compensation device detects defective pixels based on the analysis result of the luminance characteristics of the pixels (S104). The luminance deviation compensation device may transmit coordinate information of each of defective pixels to a repair process device when the defective pixel is detected.

The luminance deviation compensation device removes a measured luminance value of the defective pixel. The luminance deviation compensation device calculates a luminance value of the defective pixel by an interpolation method using measured luminance values of neighboring pixels disposed around the defective pixel and replaces the measured luminance value of the defective pixel with the luminance value calculated by the interpolation method. The luminance deviation compensation device generates compensation data for compensating for the luminance deviation of the pixels across the entire screen. The compensation data may be derived for each of the pixels in order to minimize the luminance deviation of the pixels captured by an imaging device 210 and may be determined as a positive compensation value or a negative compensation value according to the luminance characteristics (S105). The compensation data may cause a change in one or more of the offset, the gain, and the curvature in the luminance characteristics of the pixels.

The luminance deviation compensation device adds the compensation data to the pixel data and writes the pixel data to the pixels (S106). In operation S106, the compensation data applied to the pixel data may vary depending on the luminance deviation of the pixels. The imaging device 210 captures an image of a screen of a display panel 100 to which the compensation data is applied (S107). The luminance deviation compensation device analyzes the luminance characteristics of each of the pixels based on the image data to which the compensation data is applied to determine the luminance deviation between the pixels and determines whether the luminance deviation between the pixels exists within an allowable range (S108 and S109).

When the luminance deviation falls within the allowable range on the screen to which the compensation data is applied, the luminance deviation compensation device determines that there is no luminance deviation and sets the compensation data determined in operation S105 as final compensation data. The final compensation data is allocated to each of subpixels and stored in a memory of a pixel driving device configured to drive the corresponding display panel.

When the luminance deviation in the screen to which the compensation data is applied exceeds the allowable range, the luminance deviation compensation device may perform operations S106 to S109 again to compensate for the luminance deviation and adjust the compensation data until the luminance deviation is adjusted within the allowable range (S110). In this case, compensation data stored in a memory 240 is updated. The compensation data updated in the memory 240 is applied to a pixel driving device of FIGS. 19 and 20.

Figure 4:
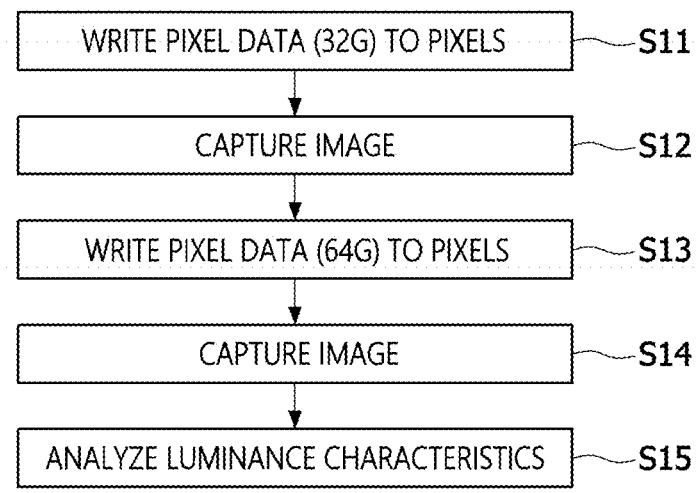
FIG. 4 is a flowchart illustrating an example in which gradation of pixel data before compensation is changed.

FIG. 4 is a flowchart illustrating an example in which gradation of the pixel data before compensation, which is applied to the pixels in operations S101 and S102, is changed.

Referring to FIG. 4, in order to more accurately determine each of the offset, the gain, and the curvature in the luminance characteristics of the pixels, the image of the screen may be captured while changing the gradation value of the pixel data.

The luminance deviation compensation device may write pixel data of a first gradation value to the pixels and capture an image of the screen (S11 and S12), calculate a first luminance characteristic of each of the pixels for each parameter from the captured image, and store the calculated first luminance characteristic in the memory 240. Subsequently, the luminance deviation compensation device may write pixel data of a second gradation value to the pixels and capture an image of the screen (S13 and S14), calculate a second luminance characteristic of each of the pixels for each parameter from the captured image, and store the calculated second luminance characteristic in the memory 240. The gradation applied to operations S11 and S13 is applied to all the pixels with the same value. The first gradation value may be a gradation value 32 (32G) and the second gradation value may be a gradation value 64 (64G), but the present disclosure is not limited thereto. The luminance deviation compensation device may determine the offset, the gain, and the curvature by comparing the first luminance characteristic and the second luminance characteristic stored in the memory 240 for each pixel and for each parameter (S15). Accordingly, the luminance deviation compensation device may determine the luminance characteristics of each of the pixels and the luminance deviation between the pixels by changing the gradation when the image is captured first.

Figure 5:
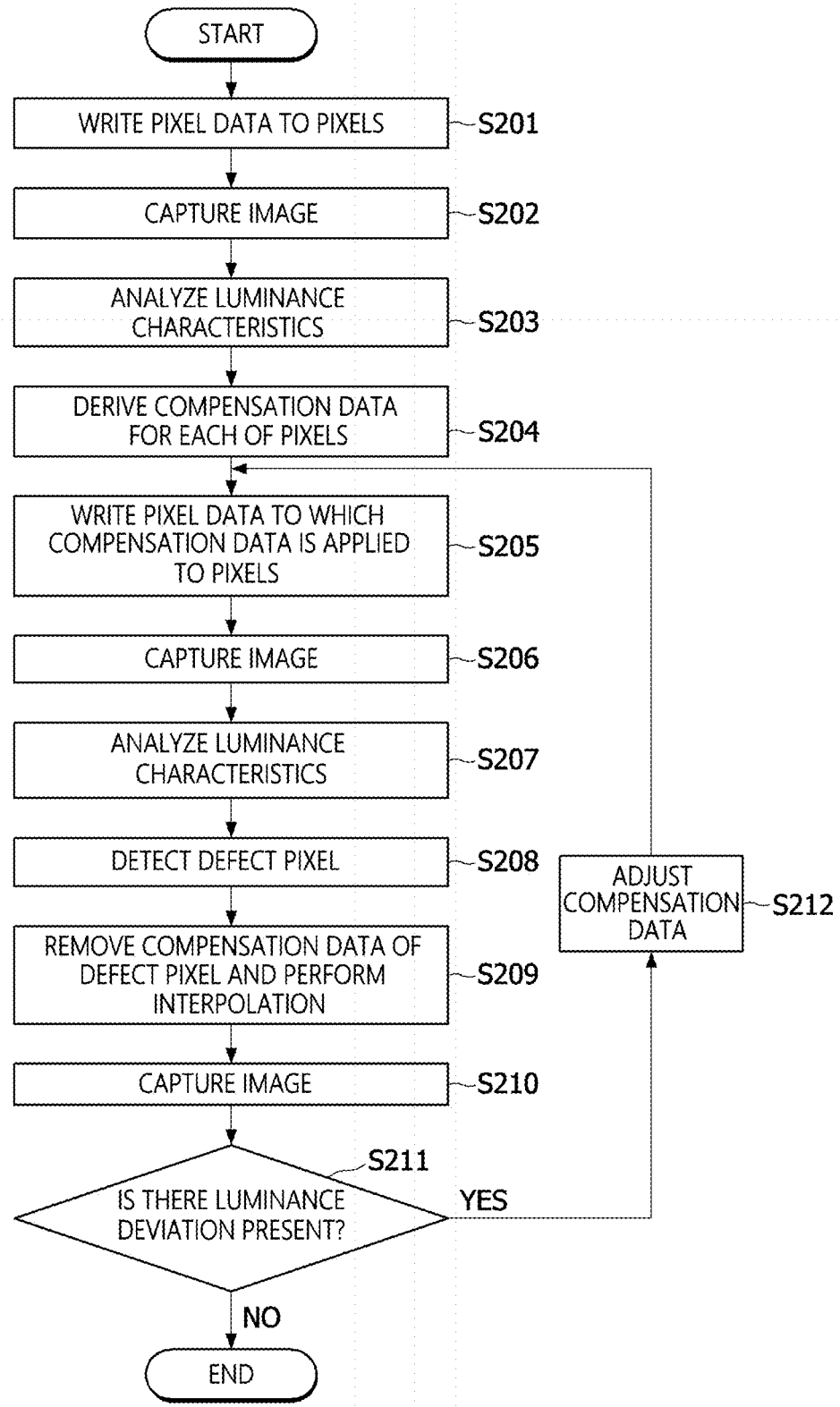
FIG. 5 is a flowchart illustrating a luminance deviation compensation method according to a second aspect of the present disclosure.

FIG. 5 is a flowchart illustrating a luminance deviation compensation method according to a second aspect of the present disclosure.

Referring to FIG. 5, a luminance deviation compensation device writes pixel data having a preset gradation value to pixels of a display panel in order to write the same gradation to the pixels and captures an image of a screen (S201 and S202). Here, the gradation value of the pixel data is applied to all the pixels with the same value because applied compensation data may not vary for each pixel. The gradation value applied in operation S201 may be a specific gradation value, for example, a gradation value 32 (32G), but the present disclosure is not limited thereto.

The luminance deviation compensation device analyzes luminance characteristics of the pixels obtained from data of the image captured in operation S202 to determine a luminance deviation between the pixels (S203). The luminance deviation compensation device derives compensation data for compensating for the luminance deviation of the pixels in the entire screen. Since the compensation data is determined for each of the pixels in order to minimize the luminance deviation of the pixels whose images are captured by an imaging device 210 as described above, values of the compensation data may be different for each pixel. The compensation data may be determined as a positive compensation value or a negative compensation value according to the luminance characteristics of each of the pixels (S204).

The luminance deviation compensation device adds compensation data to the pixel data and writes the pixel data to the pixels (S205). In operation S205, the compensation data applied to the pixel data may vary depending on the luminance deviation of the pixels. The imaging device 210 captures an image of the screen to which the compensation data is applied (S206). The luminance deviation compensation device analyzes the luminance characteristics of the pixels based on image data to which the compensation data is applied to detect defective pixels and then calculates compensation data of failed pixels by an interpolation method using compensation data of neighboring pixels or replaces the compensation data with zero (S207 to S209). Compensation data of contaminated pixels may be generated by an interpolation method using neighboring pixels.

The luminance deviation compensation device writes the compensation data of the defective pixel interpolated in operation S209 and compensation data of normal pixels into the pixels for each corresponding pixel and captures an image of the screen (S210). The luminance deviation compensation device analyzes the luminance characteristics of each of the pixels based on the image data to which the compensation data is applied to determine the luminance deviation between the pixels and determines whether the luminance deviation between the pixels exists within an allowable range (S211).

When the luminance deviation exists within the allowable range on the screen to which the compensation data is applied, the luminance deviation compensation device determines that there is no luminance deviation and sets the compensation data determined in operation S209 as final compensation data. The final compensation data is allocated to each of subpixels and stored in a memory of a pixel driving device configured to drive the corresponding display panel.

When the luminance deviation in the screen, to which the compensation data is applied, exceeds the allowable range, the luminance deviation compensation device may perform operations S205 to S211 again to compensate for the luminance deviation and adjust the compensation data until the luminance deviation is adjusted within the allowable range (S212). In this case, compensation data stored in a memory 240 is updated. The compensation data updated in the memory 240 is applied to the pixel driving device of FIGS. 19 and 20.

The final compensation data includes the compensation data of the normal pixels, and the compensation data of the defective pixels generated by an interpolation method or replaced with a preset specific value. The compensation data of the contaminated pixel may be calculated by an interpolation method using the compensation data of the neighboring pixels. The compensation data of the failed pixel may be calculated by an interpolation method or may be replaced with a specific value. The final compensation data is stored in the memory of the pixel driving device for driving the display panel.

The luminance deviation compensation device may transmit coordinate information of each of the defective pixels detected in operation S208 to a repair process device. The luminance deviation compensation device may re-write compensation data for each pixel, which includes the compensation data of the defective pixels adjusted by the interpolation method after operation S209, to the display panel and verify the compensation for the luminance deviation after re-capturing the image of the screen.

The luminance characteristics of each of the pixels may be measured based on a voltage or current that is applied to each of the pixels according to the pixel data written to the pixels, and a gamma curve that is measured based on luminance of the pixels measured by the imaging device 210. The gamma curve may be analyzed in a gradation-to-luminance domain, a voltage-to-luminance domain, and a current-to-luminance domain. It should be noted that the luminance characteristics of the pixels will be described below based on the gamma curve measured in a gradation (voltage)-to-luminance domain, but the luminance characteristics of the pixels may also be measured in a current-to-luminance domain. The luminance characteristics of the pixels may be analyzed by being divided into parameters such as a gain, an offset, and a curvature defining the gamma curve.

It is known that users feel that the gradation representation of image quality is the best when a gamma value of a display device is set to 2.2. One example of the gamma curve is shown in FIG. 6. An active-matrix-type organic light-emitting display device includes a driving element for driving a light-emitting element in each of pixels. The driving element may be implemented as a transistor.

A luminance L of the pixel may be expressed as Equation 1 below, $$L=\alpha(x-b)^c \quad \text{[Equation 1]}$$

where α represents a gain, x represents a gradation (or a voltage applied to the pixel) of pixel data, b represents an offset, and c represents a curvature of a gamma curve, i.e., a curvature indicating the degree of bending.

A luminance deviation compensation device of the present disclosure writes test pixel data to the pixels and analyzes luminance characteristics based on a measured luminance value of each of the pixels, which is obtained from a captured image of a screen, to determine luminance deviation and detect defective pixels, and measures parameters α, x, and c defining the gamma curve for the luminance characteristics of each of the pixels based on the measured luminance value of each of the pixels. In addition, the luminance deviation compensation device of the present disclosure compares measured values of the parameters defining the gamma curve with a preset allowable range to determine whether the measured values of the parameters exist in the corresponding allowable range, and detects pixels having luminance characteristics different from luminance characteristics of normal pixels as the defective pixels based on the parameters outside the allowable range.

The allowable range may be independently set for each parameter defining the gamma curve. For example, the allowable range may be divided into an offset parameter, a gain parameter, and a curvature parameter, each of which has an upper threshold value and a lower threshold value.

Figure 7A:
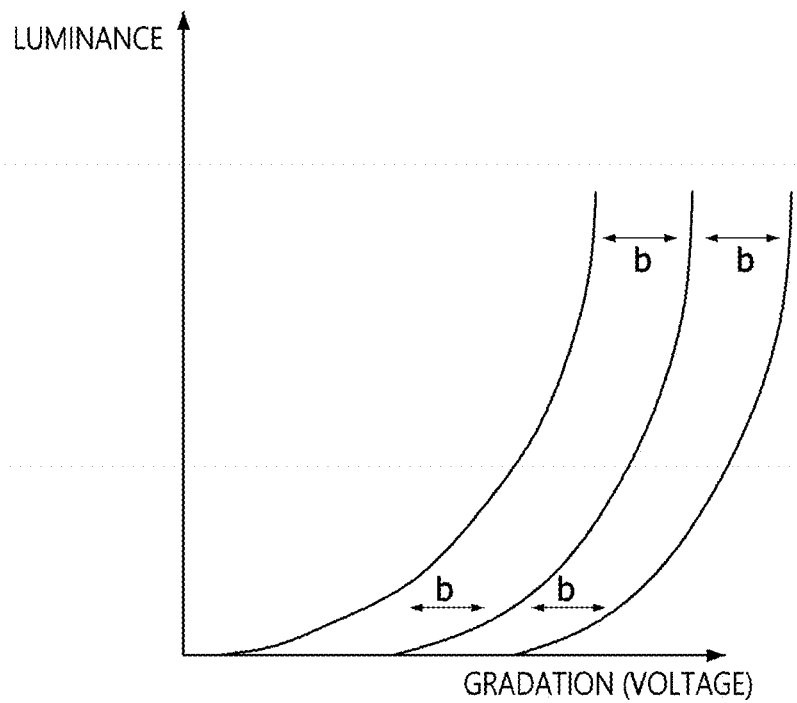
FIGS. 7A, 7B and 7C are graphs respectively illustrating an offset, a gain, and a curvature distinguished from the luminance characteristics.
Figure 7B:
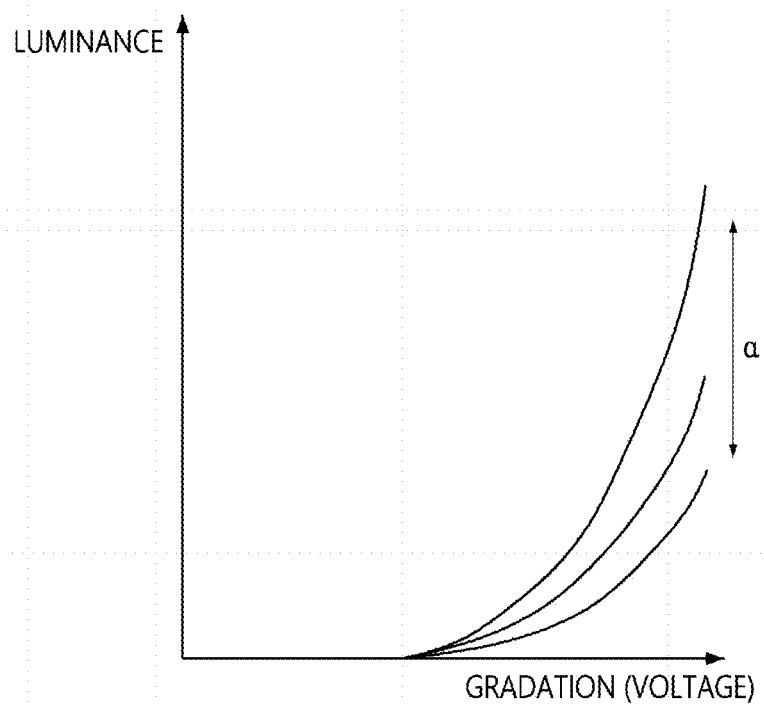
Figure 7C:
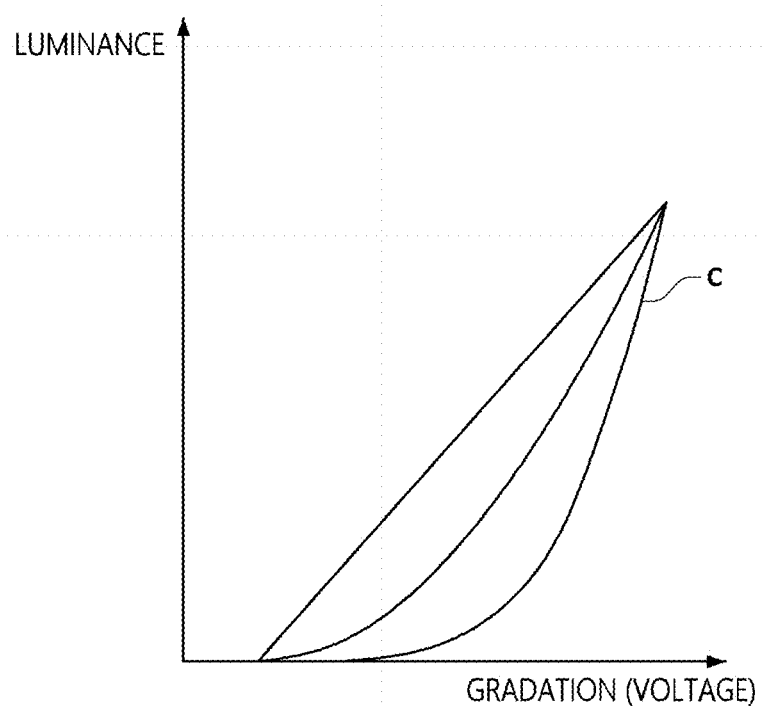

FIGS. 7A, 7B and 7C are graphs illustrating an offset, a gain, and a curvature distinguished from the luminance characteristics.

As shown in FIG. 7A, an offset b refers to a deviation of x-axis segments, which is predicted or measured in a luminance variation of the pixel, and a deviation of the x-axis segments in a luminance variation between the pixels. Here, the prediction may include an offset value calculated by an interpolation method. As shown in FIG. 7B, a gain α refers to a deviation of y-axis segments in the luminance variation between the pixels. As shown in FIG. 7C, a curvature c refers to a curvature of the gamma curve.

Figure 8:
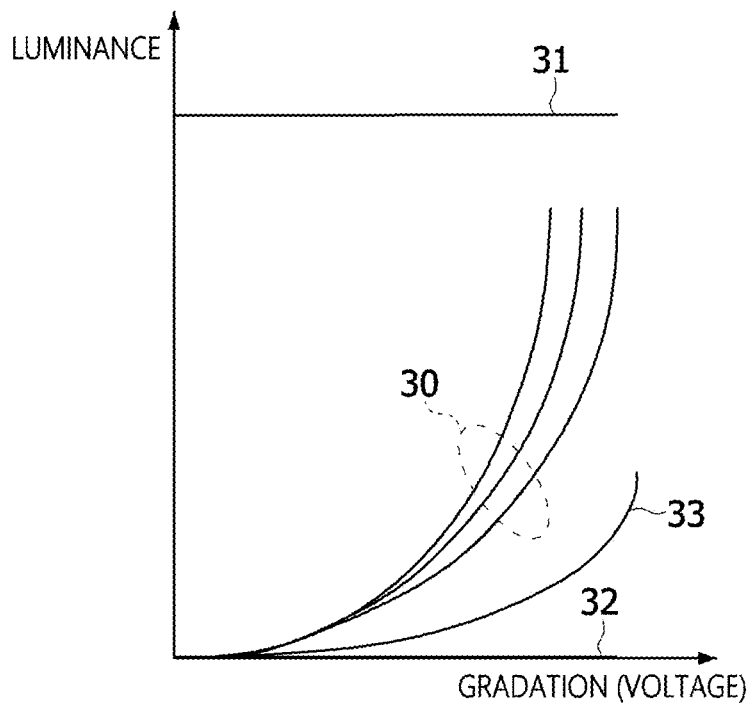
FIGS. 8 and 9 are diagrams illustrating an example of a method of distinguishing and detecting normal pixels and defective pixels based on the luminance characteristics of the pixels.
Figure 9:
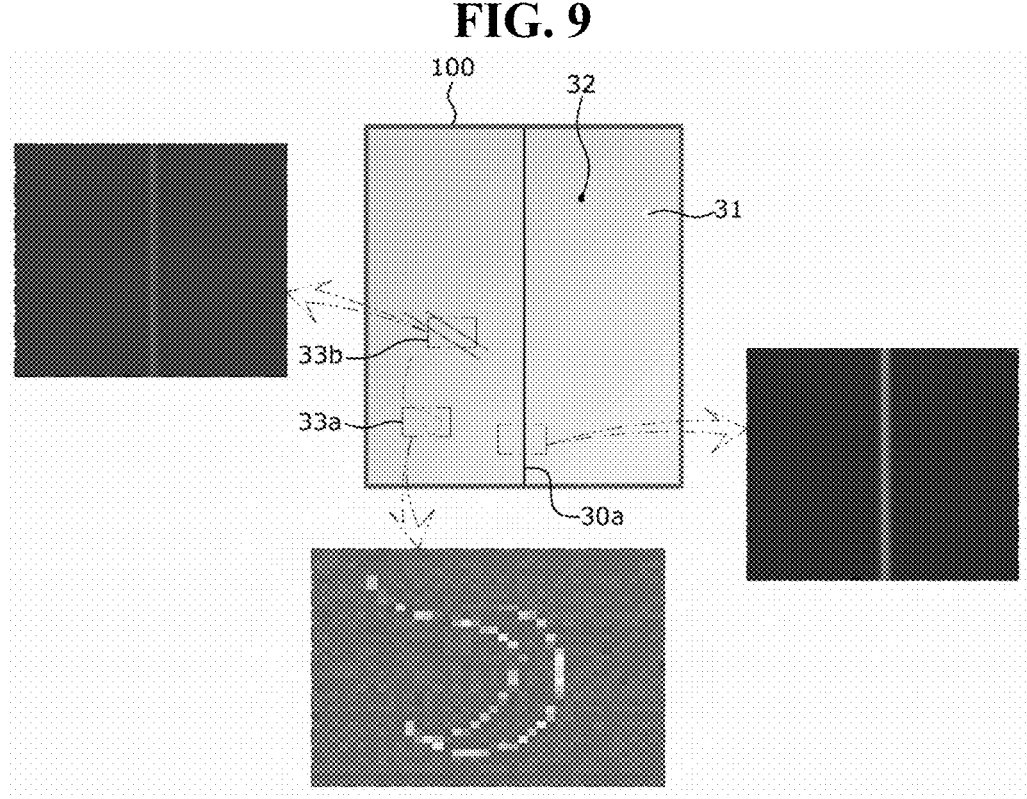

FIGS. 8 and 9 are diagrams illustrating an example of a method of distinguishing and detecting normal pixels and defective pixels based on the luminance characteristics of the pixel.

Referring to FIGS. 8 and 9, a luminance detection device may accurately detect a normal pixel 30 and defective pixels 31, 32, and 33 by determining whether each parameter of the luminance characteristics satisfies the preset allowable range. The defective pixels 31, 32, and 33 may be classified as defective pixels 31 and 32 and a contaminated pixel 33 and detected. In FIG. 8, "OK" refers to a case determined as a normal value within the allowable range. "NG" refers to a case determined as an abnormal value outside the allowable range. The allowable range may be independently set to each of the gain α, the offset b, and the curvature c.

Pixels in which all of the gain α, the offset b, and the curvature c are within the allowable range may each be determined as the normal pixel 30. In addition, pixels in which the curvature c is within the allowable range (OK), and the gain α and the offset b are outside the allowable range (OK), or pixels in which the curvature c and the gain α are within the allowable range (OK) and the offset b is outside the allowable range (OK) may each be determined as the normal pixel.

The pixels, in which a gain value among the luminance characteristics is out of an allowable gain range, have a greater luminance deviation than neighboring normal pixels and thus may appear as spots (or mura) or a bright or dark line 30a as in an example of FIG. 9. The luminance deviation compensation device may set a negative compensation value for pixels that appear as the bright line 30a to lower the luminance of the pixels and set a positive compensation value for pixels that appear as the dark line to increase the luminance of the pixels. The luminance characteristics of the normal pixels are changed according to the offset and thus may be adjusted within the allowable range by compensation data for compensating for the luminance deviation.

Pixels in which, among the gain α, the offset b, and the curvature c, the gain α is measured to be outside the allowable range (OK) and the offset b and the curvature c are measured to be within the allowable range (OK) may be determined as the contaminated pixels. Pixels in which the curvature c is outside the allowable range (OK) and at least one of the gain α and the offset b is outside the allowable range (OK) may be determined as failed pixels. The contaminated pixel includes a pixel 33a of a portion of a protective film adhered to the display panel, which is contaminated by foreign matter, and a pixel 33b of a portion of the protective film which is scratched. When the protective film is delaminated from a display panel 100, a difference in luminance between the contaminated pixel and neighboring pixels may be reduced, and the luminance characteristics may be adjusted to be within the allowable range by the compensation data for compensating for the luminance deviation.

The defective pixels 31 and 32 may include pixels that appear as a bright spot 31 or a dark spot 32 whose luminance is not changed regardless of the gradation of the pixel data, that is, the offset. In the defective pixels 31 and 32, all of the gain α, the offset b, and the curvature c may be outside the allowable range.

In the case of contaminated pixels and failed pixels, when compensation data is generated based on the measured luminance value, luminance of these pixels may overcompensate for luminance of the neighboring pixels, which may lead to a portion with a large luminance deviation appearing enlarged. In the present disclosure, a luminance value of the defective pixels including the contaminated pixel and the failed pixel is interpolated using the neighboring pixels after removing the measured luminance value of the defective pixels or the compensation data of the defective pixels, so that the phenomenon of the defective pixels appearing enlarged may be prevented and the luminance deviation may be minimized over the entire screen. In another aspect of the present disclosure, the measured luminance value or compensation data of the contaminated pixels may be interpolated using the measured luminance value or compensation data of the neighboring pixels, and the measured luminance value or compensation data of the failed pixels may be replaced with zero.

Figure 10:
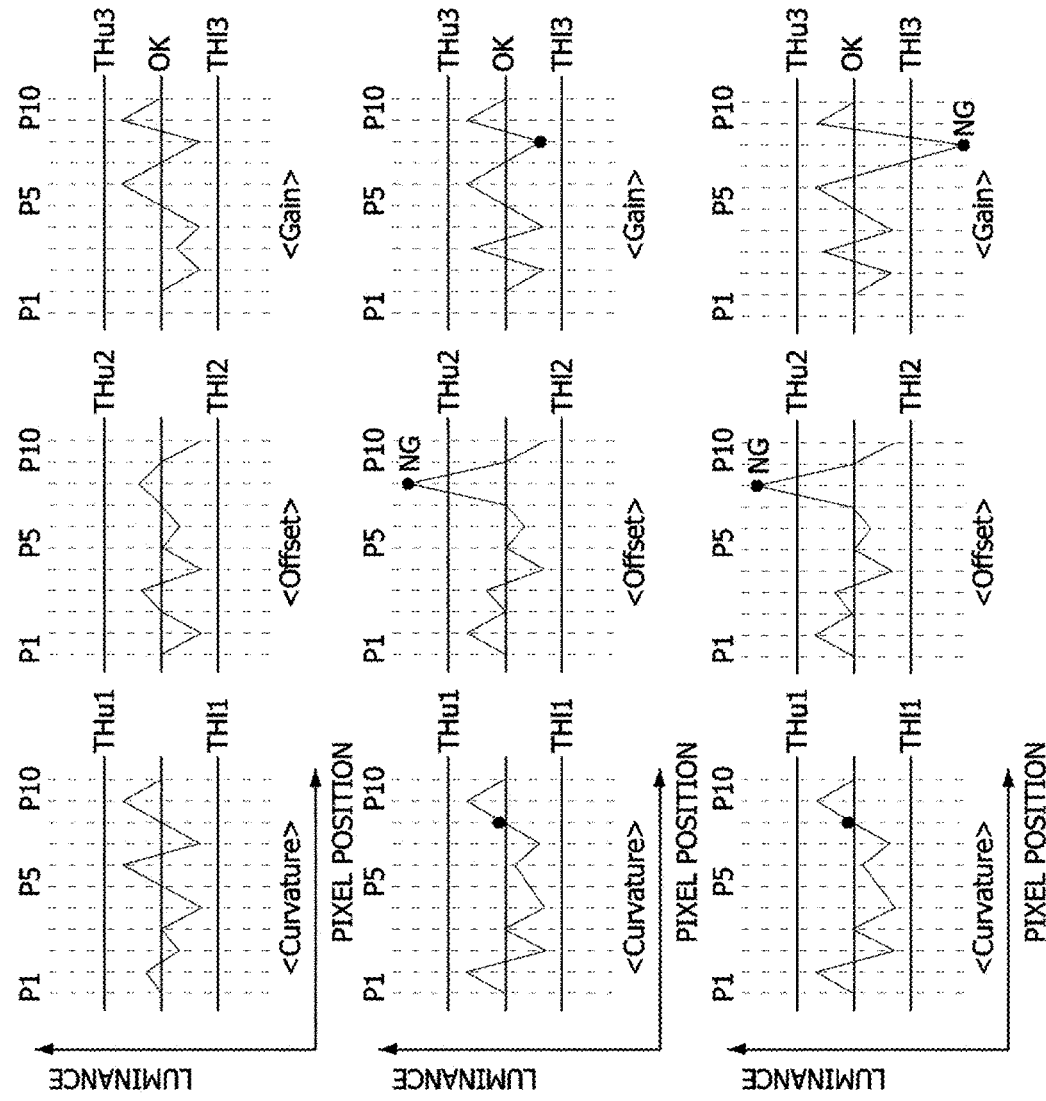
FIG. 10 is a set of graphs illustrating examples of normalized values illustrating the luminance characteristics of the normal pixels.

FIG. 10 is a set of graphs illustrating an example of normalized values illustrating luminance characteristics of the normal pixels. In FIG. 10, "P1," "P5," and "P10" are numbers of pixels arranged in series along an x-axis direction or a y-axis direction of the screen. "THu1 to THu3" are upper threshold values of the allowable range (OK), and "THl1 to THl3" are lower threshold values of the allowable range (OK).

Referring to FIG. 10, in the case of normal pixels, all of the gain a, the offset b, and the curvature c may have values within the allowable range (OK). In addition, in the normal pixels, the curvature c may have a value within the allowable range (OK), and the gain α and the offset b are outside the allowable range (OK) or the offset b is outside the allowable range (OK).

Figure 11:
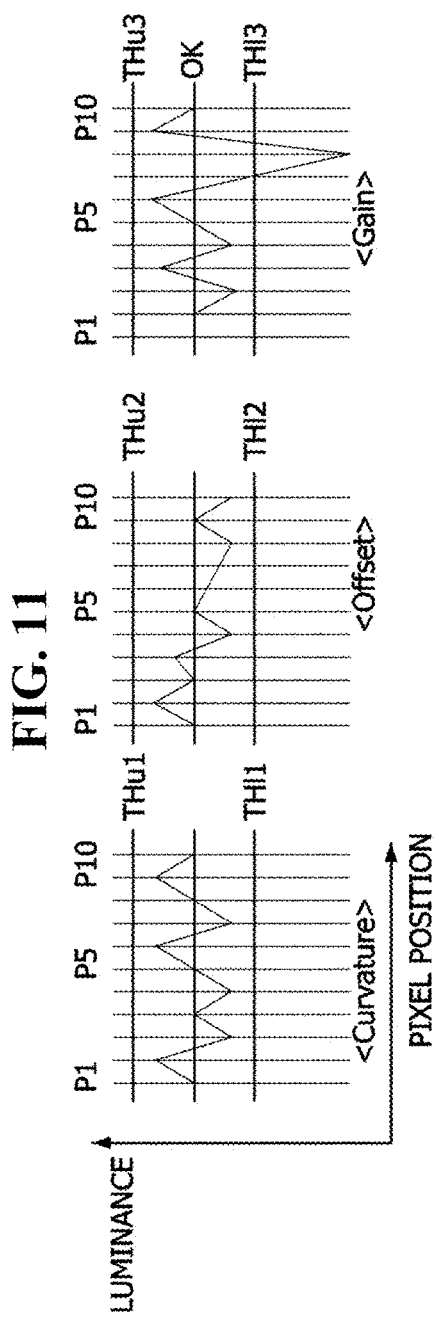
FIG. 11 is a set of graphs illustrating an example of normalized values illustrating luminance characteristics of contaminated pixels.

FIG. 11 is a set of graphs illustrating an example of normalized values illustrating luminance characteristics of the contaminated pixels.

Referring to FIG. 11, in the case of contaminated pixel, the offset b and the curvature c may be determined to be within the allowable range (OK), and the gain a may be determined to be outside the allowable range (OK).

Figure 12:
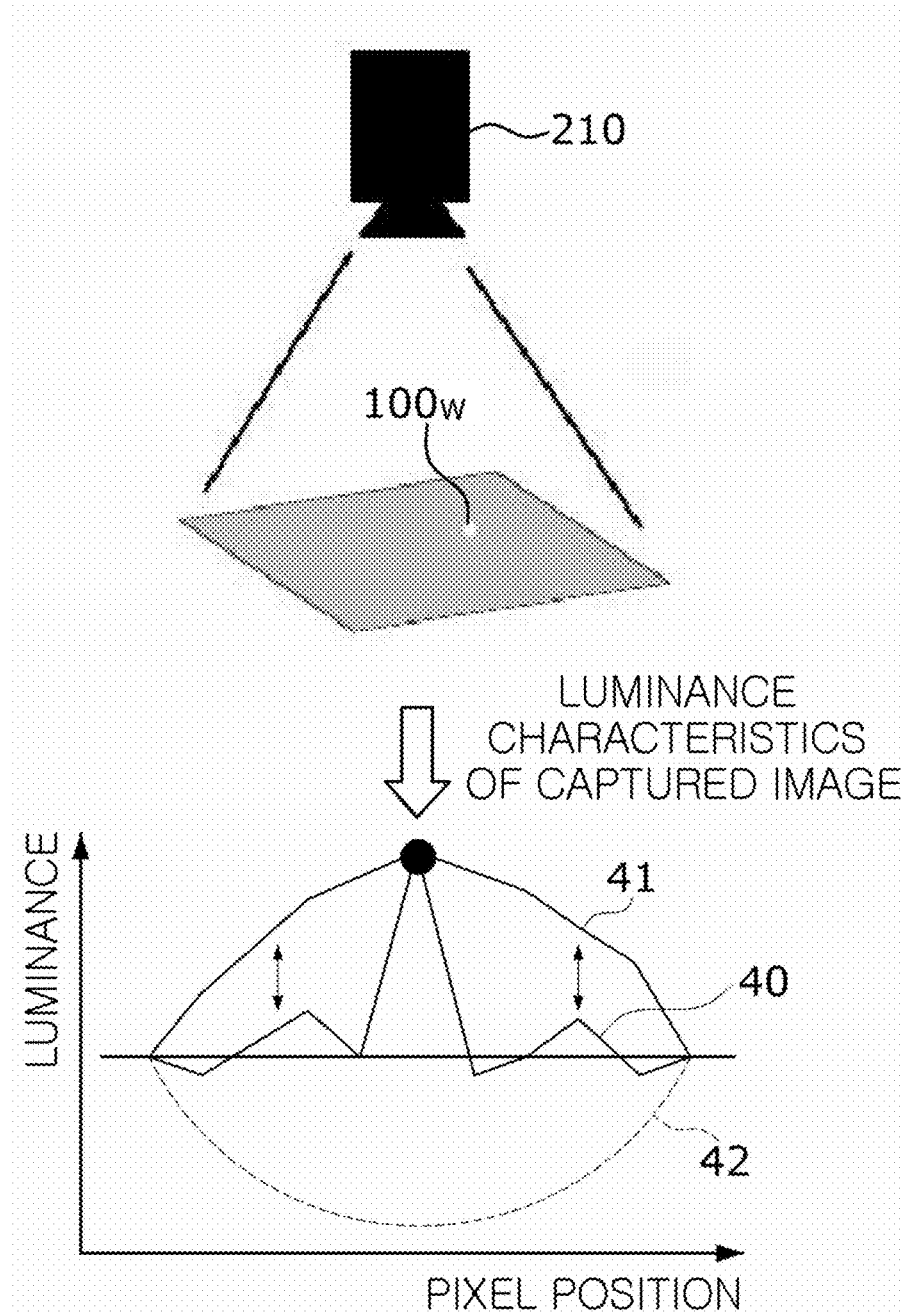
FIGS. 12 and 13 are diagrams illustrating examples in which luminance of a failed pixel, which is obtained from the result of a captured image, affects luminance of neighboring pixels.
Figure 13:
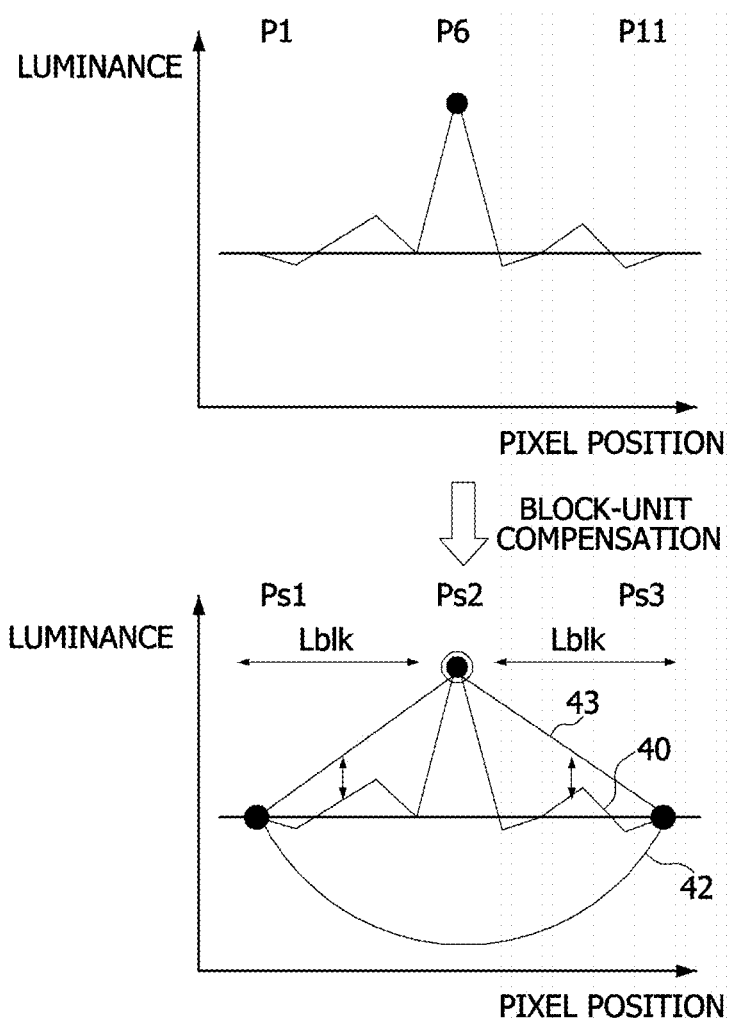

FIGS. 12 and 13 are diagrams illustrating examples in which luminance of the failed pixel, which is obtained from the result of the captured image, affects luminance of the neighboring pixels.

Referring to FIGS. 12 and 13, depending on imaging conditions of the camera and optical characteristics of the display panel, the luminance of the neighboring pixels may be erroneously measured due to the luminance of the pixels with large luminance deviation, for example, the pixels that appear as dark spots or bright spots. For example, an actual luminance (40) of the neighboring pixels of a bright spot 100w is low, but a measured luminance value of neighboring pixels may be increased due to the bright spot 100w. In this case, this leads to a result of increasing the bright spot 100w more than the actual size, and the neighboring pixels 41 of the bright spot 100w may be overcompensated for and thus may be seen as a large dark spot. In FIGS. 12 and 13, "42" indicates an erroneously compensated luminance when luminance or compensation data of the bright spot 100w is not removed.

The imaging conditions of the camera may be made more elaborate, for example, to increase the resolution of the imaging luminance in units of pixels. In this case, as shown in FIG. 13, the luminance of the pixels may be compensated for by a block compensation method. In FIG. 13, when the pixels, which appear as the bright spot 100w, are sampled pixels and the neighboring pixels are non-sampled pixels, "43" indicates the erroneously compensated luminance of the neighboring pixels in a state in which the measured luminance value of the sampled pixels that appear as a bright spot is not removed from the luminance calculated by an interpolation method.

In the block compensation method, the luminance or compensation data of the neighboring pixels of the bright spot may be calculated as a value that is greater than the actual luminance (40) when the neighboring pixels of the bright spot are not the sampled pixel. This is because, in the block compensation method, luminance of the pixels between sampled pixels Ps1, Ps2, and Ps3 is calculated by an interpolation method using a measured luminance value or compensation data of each of the sampled pixels Ps1, Ps2, and Ps3.

Figure 14:
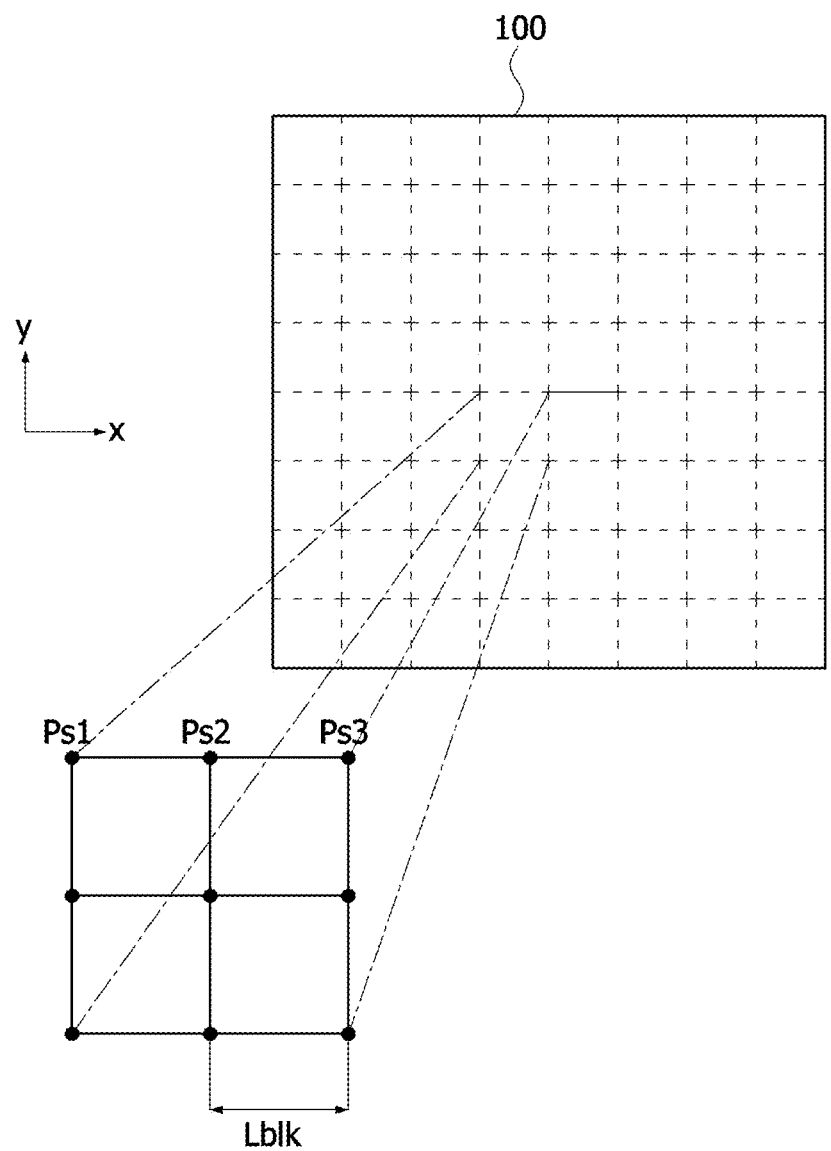
FIG. 14 is a schematic diagram illustrating a block-unit compensation method.

FIG. 14 is a schematic diagram illustrating a block-unit compensation method.

Referring to FIG. 14, in order to reduce a hardware resource, instead of deriving the measured luminance value or compensation data from all the pixels, the luminance deviation compensation device virtually divides the screen of the display panel 100 into blocks having a size of 4×4 or 8×8 pixels in each of an x axis and a y axis and selects the pixels located at vertices of each block as sampled pixels and derives the measured luminance value and compensation data of the sampled pixels Ps1, Ps2, and Ps3. In FIG. 13, "Lblk" indicates a length of one block in the x-axis direction. In FIG. 13, first, sixth, and eleventh pixels P1, P6, and P11 are exemplified as sampled pixels.

Luminance or compensation data of the unsampled pixels may be calculated by an interpolation method using the measured luminance value or compensation data of the neighboring pixels of the sampled pixels. For example, luminance of non-sampled pixels between the first and sixth pixels P1 and P6 may be calculated with a higher interpolation value toward a sixth pixel P6 that appears as the bright spot 100w.

Figure 15:
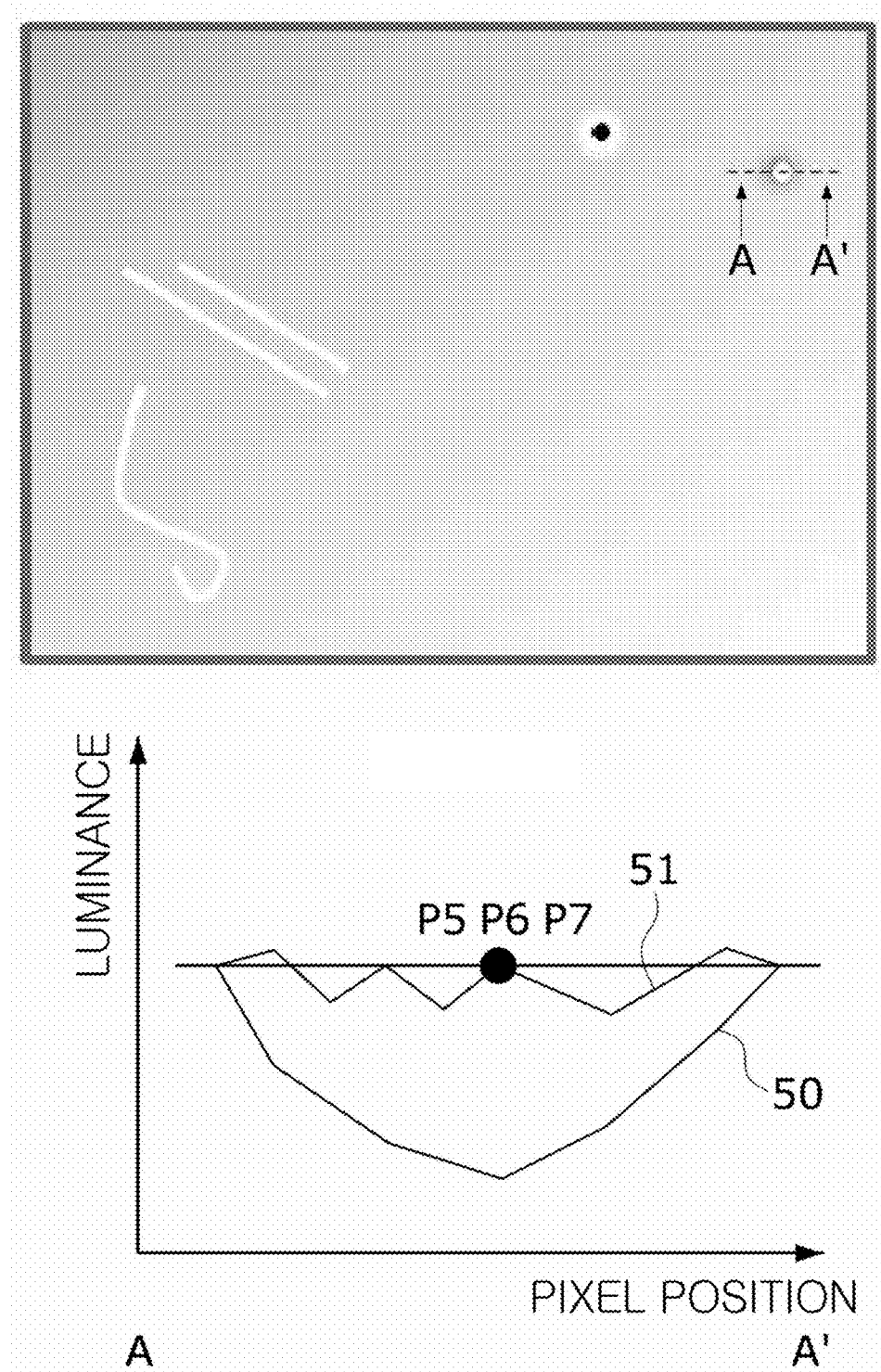
FIG. 15 is a diagram illustrating a luminance compensation defective of a screen when the measured luminance value or compensation data derived based on the measured luminance value of each of the defective pixels is not removed.

When the measured luminance value of the defective pixels or the compensation data derived based on the measured luminance value is not removed, after the compensation is performed, the defective pixels having a larger luminance deviation than the neighboring pixels may be seen as in the example of FIG. 15. For example, the neighboring pixels of the bright spot appear dark due to a large negative compensation value for lowering the luminance of the bright spot, and the neighboring pixels of the dark spot may appear bright due to a large positive compensation value for increasing the luminance of the dark spot. Accordingly, the neighboring pixels of the failed pixels, such as the bright spot and the dark spot, are overcompensated for such that a luminance compensation defective area having a large luminance deviation may appear enlarged.

Even in the case of contaminated pixels, when the measured luminance value of the contaminated pixels or the compensation data derived based on the measured luminance value is not removed, the luminance of the neighboring pixels as well as the contaminated pixels may be overcompensated for due to the large compensation data of the contaminated pixels, as in the example of FIG. 15. The graph at a lower side of FIG. 15 illustrates a bright spot measured along line A-A' and luminance around the bright spot. Reference numeral "50" denotes an overcompensated luminance value around the bright spot when the measured luminance value or compensation data of the bright spot pixel is not removed. Reference numeral "51" denotes a luminance value in which the luminance value or compensation data is applied to the neighboring pixels by the interpolation method after the measured luminance value or compensation data of the bright spot pixel is removed. The bright spot pixel may become a dark spot pixel in the repair process.

In the present disclosure, as shown in FIG. 16, the measured luminance value or compensation data of the defective pixel, for example, a bright spot pixel P6, is removed, and the luminance value or compensation data of the bright spot pixel P6 is calculated by an interpolation method using the neighboring pixels P5 and P7 or is replaced with 0. As a result, the luminance deviation between the defective pixel and the neighboring pixels of the defective pixel is reduced after compensation. In FIG. 16, reference numeral "60" denotes the measured luminance value of the bright spot pixel and the neighboring pixels of the bright spot pixel. Reference numeral "61" denotes luminance obtained by removing the measured luminance value of the bright spot pixel P6 and interpolating the luminance of the bright spot pixel P6 to be an intermediate value of the neighboring pixels P5 and P7 by an interpolation method using the measured luminance value of the neighboring pixels P5 and P7 of the bright spot pixel. Reference numeral "62" denotes compensation data of the bright spot pixel P6 and the neighboring pixels of the bright spot pixel P6 derived after the measured luminance value of the bright spot pixel P6 is removed and the luminance of the bright spot pixel P6 is interpolated.

Figure 17:
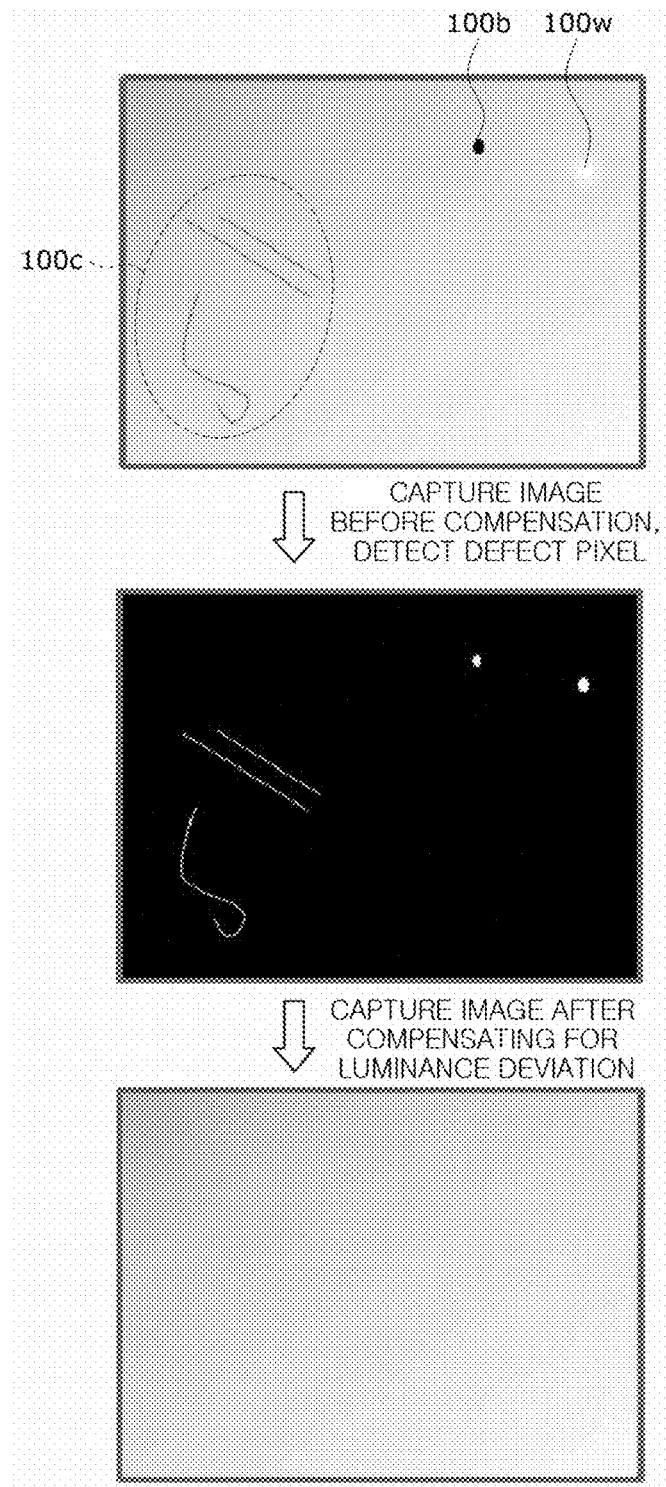
FIG. 17 is a diagram illustrating a compensation effect after removing the measured luminance value or compensation data of each of the defective pixels.

FIG. 17 is a diagram illustrating a compensation effect after removing the measured luminance value or compensation data of each of the defective pixels.

Referring to FIG. 17, the luminance deviation compensation device captures an image of the screen in which defective pixels exist and detects defective pixels based on the captured image. The defective pixels may include a bright spot pixel 100w, a dark spot pixel 100b, and a contaminated pixel 100c. Subsequently, the luminance deviation compensation device calculates luminance of the defective pixels by an interpolation method after removing a measured luminance value of each of the defective pixels, or calculates compensation data of the defective pixels by an interpolation method using compensation data of neighboring pixels by deriving the compensation data based on a measured luminance value of each all the pixels including the defective pixels and then removing the compensation data of the defective pixels or replaces the compensation data with zero. As a result, the defective pixels are not visible in a captured image of the screen after compensation, and an image without luminance deviation may be obtained.

Figure 18A:
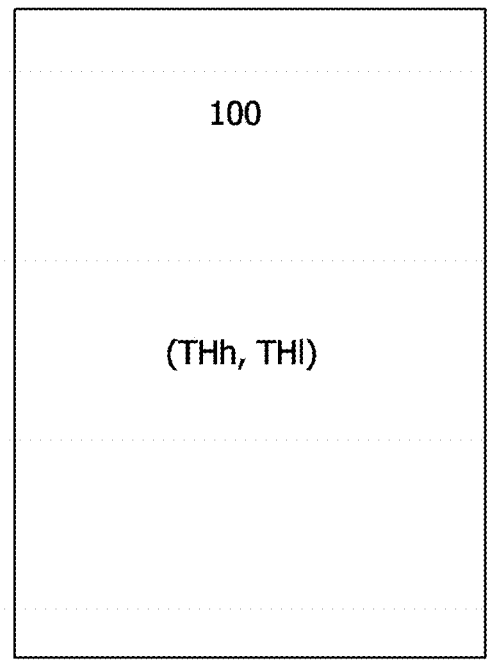
FIGS. 18A, 18B and 18C are diagrams illustrating various methods of setting an allowable range.
Figure 18B:
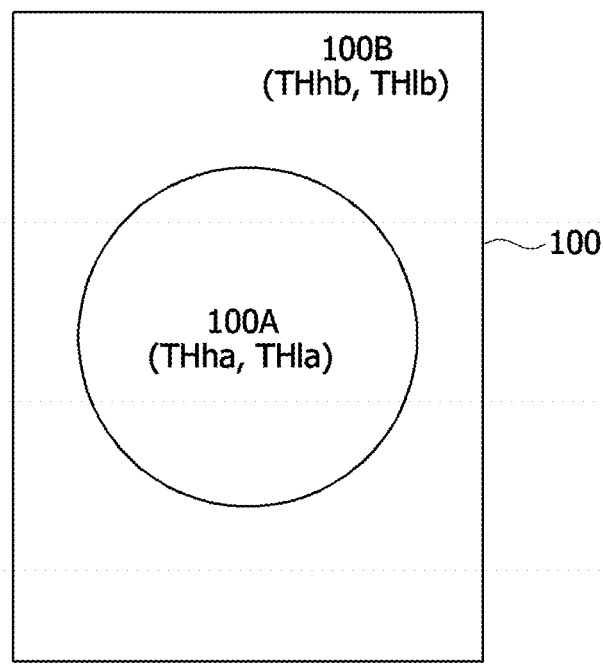

In the present disclosure, normal pixels and defective pixels are determined by determining whether parameters, which are divided into a gain a, an offset b, and a curvature c, are within a preset allowable range. An upper threshold value and a lower threshold value of the allowable range may be independently set for each parameter. In addition, the allowable range may be set by a global setting method, a local setting method, and an adaptive setting method. As shown in FIG. 18A, in the global setting method, an upper threshold value THh and a lower threshold value THl are equally set for each parameter on the entire screen. In the local setting method, the upper threshold value and the lower threshold value are set differently for each parameter according to a position on the screen considering that the luminance may vary according to the position on the screen when taking into account imaging conditions of a camera, lens aberrations, and the like. For example, as shown in FIG. 18B, threshold values THha and THla of a central portion 100A of the screen, and threshold values THhb and THlb of a peripheral portion 100B of the screen may be set differently. In the image of the screen captured by the camera, luminance of the peripheral portion of the screen may be measured to have a higher value than that of the central portion. In this case, the threshold values THhb and THlb of the peripheral portion 100B of the screen may be set to have values less than those of the threshold values THha and THla of the central portion 100A.

Figure 18C:
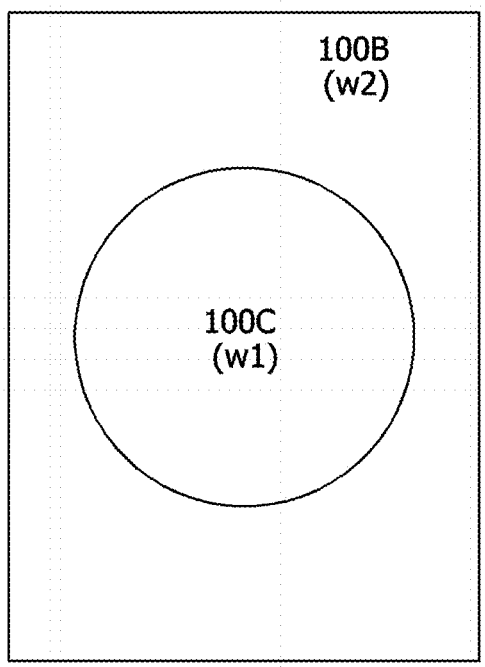

The adaptive setting method is a method of adaptively setting a threshold value in units of pixels or local areas in consideration of luminance distribution characteristics of the screen. For example, as in the example of FIG. 18C, when luminance of the pixels in a peripheral portion 100B is measured to have a high value as a result of capturing an image of the screen even when a defective pixel does not exist, a weight w2 to be multiplied to a threshold value of the peripheral portion may be set to have a lower value than a weight w1 of a central portion 100C.

The present disclosure is applicable to any display device in which luminance deviation needs to be compensated for. For example, the present disclosure is applicable to various flat panel display devices such as a liquid crystal display (LCD) device and a light-emitting display device. The light-emitting display device may be divided into an inorganic light-emitting display device and an organic light-emitting display device according to a material of a light-emitting layer. An active-matrix-type organic light-emitting display device includes an organic light-emitting diode (hereinafter, referred to as "OLED") that emits light by itself and has advantages in terms of a fast response rate, high light emission efficiency, high luminance, and a large viewing angle. In particular, since the organic light-emitting display device may represent black gradation as perfect black, the organic light-emitting display device may reproduce an image that is remarkably improved in contrast ratio and color gamut.

In the following aspects, an organic light-emitting display device is described as an example of the display device of the present disclosure, but the present disclosure is not limited thereto.

Figure 19:
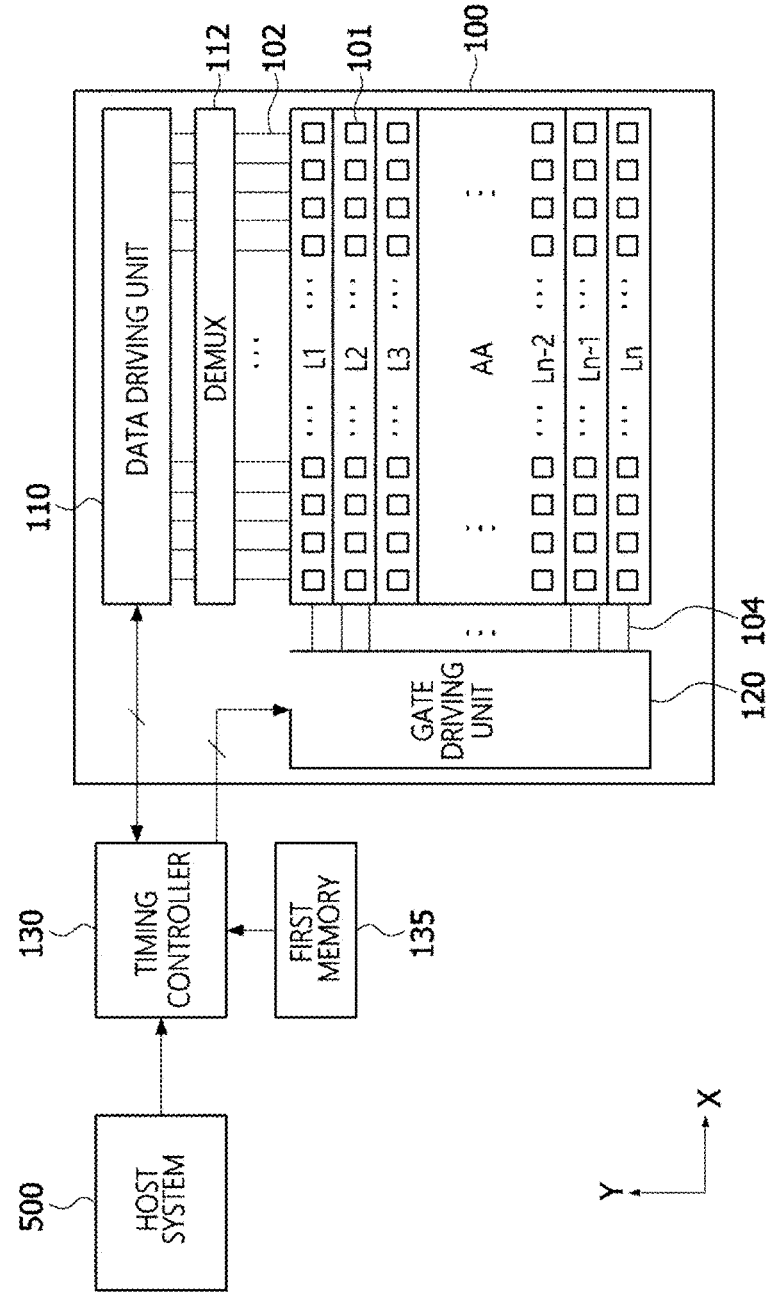
FIGS. 19 and 20 are block diagrams illustrating a display device according to an aspect of the present disclosure.
Figure 20:
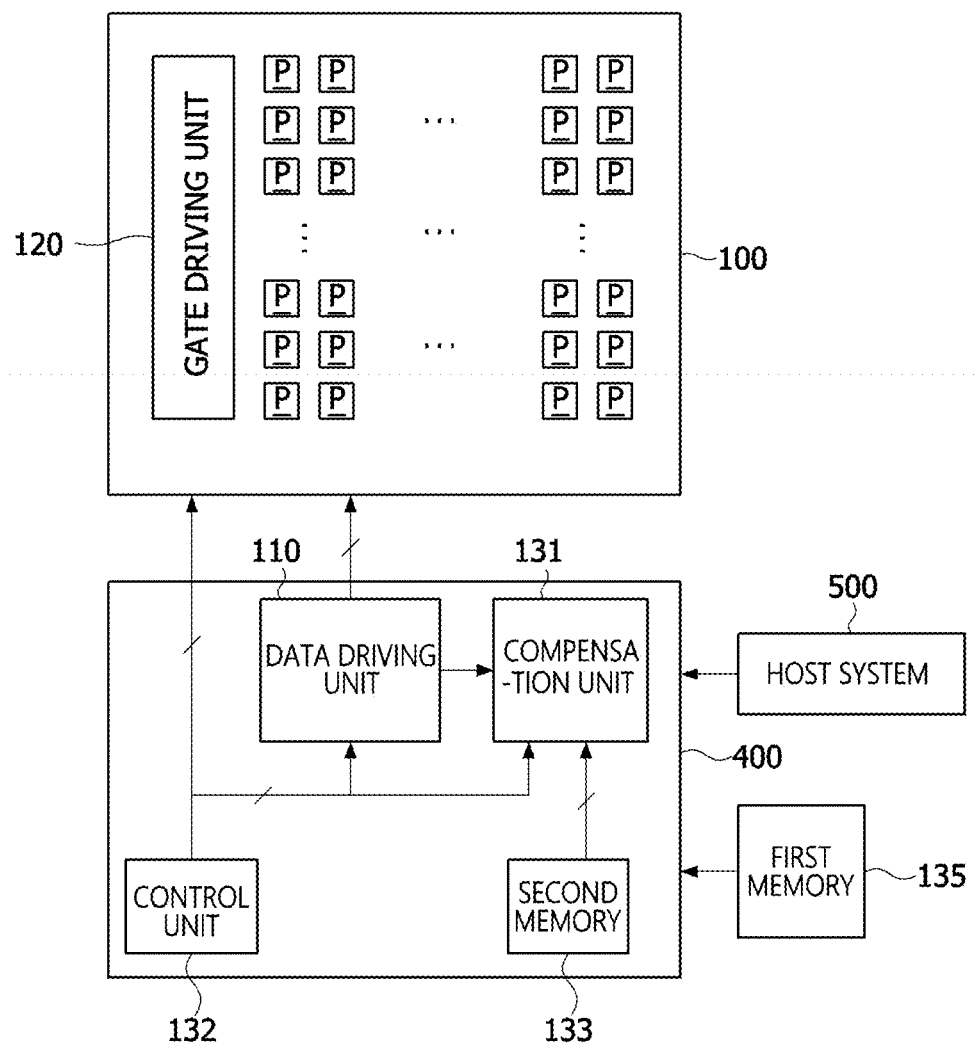

FIGS. 19 and 20 are block diagrams illustrating a display device according to an aspect of the present disclosure.

Referring to FIGS. 19 and 20, the display device includes a display panel 100 and the pixel driving device for writing pixel data to pixels of the display panel 100.

A screen of the display panel 100 includes a pixel array AA configured to display an input image. The pixel array AA includes a plurality of data lines 102, a plurality of gate lines 104 intersecting the data lines 102, and pixels.

The pixels may be arranged on a screen AA in a matrix form defined by data lines DL and gate lines GL. In addition to the matrix form, the pixels may be arranged on the pixel array AA in various ways, such as in a form sharing pixels emitting the same color, in a stripe form, and in a diamond form.

The pixel array includes pixel columns and pixel lines L1 to Ln intersecting the pixel columns. The pixel columns include pixels disposed along a y-axis direction. The pixel lines include pixels disposed along an x-axis direction. One vertical period is one frame period required to write one frame amount of pixel data to all the pixels of the screen. One horizontal period 1H is a scan time required to write pixel data to be written to the pixels of one pixel line sharing the gate line to the pixels of one pixel line. One horizontal period is a time obtained by dividing one frame period by the number of m pixel lines L1 to Lm.

Each of the pixels may be divided into a red (R) subpixel, a green (G) subpixel, and a blue (B) subpixel. Each of the pixels may further include a white subpixel. Each of the subpixels includes a pixel circuit. The pixel circuit may include a light-emitting element, a driving element connected to the light-emitting element, a plurality of switching elements, and a capacitor. The light-emitting element may be implemented as an OLED. The driving element and the switching element may be implemented as transistors.

The light-emitting element emits light due to a current generated according to a gate-to-source voltage Vgs of the driving element, which varies according to a data voltage of pixel data. The OLED may be implemented as an OLED including an organic compound layer formed between an anode and a cathode. The organic compound layer may include a hole injection layer HIL, a hole transport layer HTL, a light-emitting layer EML, an electron transport layer ETL, an electron injection layer EIL, and the like, but the present disclosure is not limited thereto.

The driving element should have uniform electrical characteristics between all the pixels, but there may be differences in electrical characteristics between the pixels due to a process variation and an element characteristic variation, and the electrical characteristics may vary as a display driving time passes. In order to compensate for the electrical characteristic variation of the driving element, the organic light-emitting display device may include an internal compensation circuit and an external compensation circuit. The internal compensation circuit is added to the pixel circuit in each of the subpixels to sample a threshold voltage Vth and/or a mobility μ of the driving element, which varies according to the electrical characteristics of the driving element, and compensate for the variation in real time. The external compensation circuit transmits the threshold voltage and/or mobility of the driving element, which are sensed through the sensing line connected to each of the subpixels, to an external compensation unit. The compensation unit of the external compensation circuit reflects the sensing result to modulate the pixel data of the input image, thereby compensating for the variation in the electrical characteristics of the driving element. A voltage of the pixel, which varies according to electrical characteristics of an external compensation driving element, is sensed, and data of an input image is modulated in an external circuit based on the sensed voltage, thereby compensating for the variation in the electrical characteristics of the driving element between the pixels.

The compensation data derived by the luminance deviation compensation device of the present disclosure is set to each of the subpixels to compensate for the luminance deviation of the pixels. The compensation data may be stored in a memory of a compensation unit added separately from the internal compensation circuit and the external compensation circuit.

Touch sensors may be disposed on the display panel 100. A touch input may be sensed using additional touch sensors or may be sensed using the pixels. The touch sensors may be implemented as On-cell type or Add-on type touch sensors disposed on the screen of the display panel or may be In-cell type touch sensors embedded in the pixel array.

Pixel driving devices 110, 112, and 120 include a data driving unit 110 and a gate driving unit 120. A demultiplexer (DEMUX) 112 may be disposed between the data driving unit 110 and the data lines 102.

The pixel driving devices 110, 112, and 120 display the input image on the screen by writing data of the input image to the pixels of the display panel 100 under the control of a timing controller (TCON) 130. The pixel driving devices 110, 112, and 120 may further include a touch sensor driving unit for driving the touch sensors. The touch sensor driving unit is omitted from FIG. 20. In a mobile device or a wearable device, the data driving unit 110, the timing controller 130, and a power supply may be integrated into one Integrated Circuit (IC) 400 as shown in FIG. 20. The power supply generates power required to drive pixels P of the display panel.

The data driving unit 110 may be implemented as one or more source driver ICs. The data driving unit 110 converts the pixel data (digital data) received from the timing controller 130 into a gamma compensation voltage to output a data voltage Vdata. The data voltage Vdata may be directly supplied to the data lines 102 or distributed to the data lines 102 through the demultiplexer 112.

The demultiplexer 112 is disposed between the data driving unit 110 and the data lines 102. The demultiplexer 112 distributes the data voltage Vdata continuously output through one channel of a source driver IC SIC to the data lines 102 using a plurality of switching elements connected between the one channel of the source driver IC SIC and the plurality of data lines. Since one channel of the data driving unit 110 is time division-connected to the plurality of data lines by the demultiplexer 112, the number of the data lines 102 may be reduced.

The gate driving unit 120 may be implemented as a Gate in Panel (GIP) circuit formed directly in a bezel area on the display panel 100 together with a thin-film transistor (TFT) array of the pixel array AA. The gate driving unit 120 outputs a gate signal to the gate lines 104 under the control of the timing controller 130. The gate driving unit 120 may sequentially supply the signal to the gate lines 104 by shifting the gate signal using a shift register. The gate signal may be synchronized to the data voltage Vdata. The data voltage Vdata may be divided into a data voltage of the input image and a data voltage for sensing. The data voltage of the input image is a gradation voltage of the pixel data.

Gate signals SCAN and SENSE may be generated as pulses that swing between a gate-on voltage VGH and a gate-off voltage VGL. Switching elements M1 and M2 of the pixel circuit are turned on in response to the gate-on voltage VGH of the gate signals SCAN and SENSE.

As shown in FIG. 20, the timing controller 130 may include a control unit 132 configured to generate timing control signals synchronized with the pixel data transmitted to the data driving unit 110 and control operation timing of the pixel driving devices 110, 112, and 120, and a compensation unit 131 configured to modulate the pixel data using the compensation data previously set by the luminance deviation compensation device.

The timing controller 130 receives pixel data of the input image and a timing signal synchronized therewith from a host system 500. The pixel data is digital data. The timing signal received by the timing controller 130 may include a vertical synchronization signal Vsync, a horizontal synchronization signal Hsync, a clock signal DCLK, a data enable signal DE, and the like. The data enable signal DE may be countered in the timing controller 130 to generate vertical period timing and horizontal period timing. In this case, the vertical synchronization signal Vsync and the horizontal synchronization signal Hsync may be omitted from the timing signal received by the timing controller 130.

The timing controller 130 generates data timing control signals for controlling the operation timing of the pixel driving devices 110, 112, and 120 based on the timing signals Vsync, Hsync, and DE received from the host system 500 and controls the pixel driving devices 110, 112, and 120. A voltage level of a gate timing control signal, which is output from the timing controller 130, may be converted into a gate-on voltage and a gate-off voltage through a level shifter (not shown) and supplied to the gate driving unit 120. The level shifter converts a low-level voltage of the gate timing control signal into a gate-low voltage VGL and converts a high-level voltage of the gate timing control signal into a gate-high voltage VGH.

The timing controller 130 adds preset compensation data to pixel data of the input image input from the host system 500 to compensate for the luminance deviation of the pixels.

The host system 500 may be any one of a television system, a set-top box, a navigation system, a personal computer (PC), a vehicle system, a home theater system, a mobile device, and a wearable device.

Referring to FIG. 20, a driver IC 400 includes the control unit 132, the data driving unit 110, a second memory 133, the compensation unit 131, and the like.

When power is input to the display device, the second memory 133 stores compensation data received from a first memory 135 and supplies the compensation data to the compensation unit 131. The compensation data includes final compensation data derived by the luminance deviation compensation device described above. The compensation unit 131 receives pixel data of the input image from the host system 300. The compensation unit 131 adds the compensation data input from the second memory 133 to the pixel data of the input image and transmits the pixel data to the data driving unit 110. Accordingly, the pixel data input to the data driving unit 110 is modulated using the compensation data for compensating for the luminance deviation between the pixels based on the image captured by the imaging device 210.

According to the present disclosure, various types of defective pixels can be quickly and accurately detected by analyzing luminance characteristics of pixels from a captured screen image and detecting defective pixels.

According to the present disclosure, compensation data of pixels on a screen where a defective pixel exists can be optimized by removing a measured luminance value or compensation data of each of defective pixels and then changing the measured luminance value or compensation data of each of the defective pixels by an interpolation method using neighboring pixels.

According to the present disclosure, image quality of a display device can be improved by minimizing a luminance deviation across the entire screen by removing a measured luminance value or compensation data of defective pixels to prevent neighboring pixels of the defective pixel from being overcompensated.

According to the present disclosure, compensation for a luminance deviation can be precisely determined by optimizing an allowable range of each of parameters for determining luminance characteristics in consideration of an imaging condition, a characteristic of a display panel, and a luminance distribution characteristic of a captured screen image.

Effects which can be achieved by the present disclosure are not limited to the above-mentioned effects. That is, other features that are not mentioned may be obviously understood by those skilled in the art to which the present disclosure pertains from the following description.

Various aspects of the luminance deviation compensation method of the present disclosure will be described below.

First Aspect: the luminance deviation compensation method includes writing test pixel data to pixels on a screen of a display panel and capturing an image of the screen; analyzing luminance characteristics based on a measured luminance value of each of the pixels, which is obtained from data of the image of the screen captured by an imaging device, to determine a luminance deviation and detecting a defective pixel; deriving compensation data for reducing the luminance deviation between the pixels for each pixel; and removing the measured luminance value or the compensation data of the defective pixel.

Second Aspect: the analyzing of the luminance characteristics based on the measured luminance value of each of the pixels, which is obtained from the image data of the screen, to determine the luminance deviation and detecting the defective pixel includes: measuring parameters for defining a gamma curve of the luminance characteristics of each of the pixels based on the measured luminance value of each of the pixels; comparing the measurement value of each of the parameters with the allowable range for each parameter to determine whether a measurement value of each of the parameters exists within a corresponding preset allowable range; and detecting the pixel having luminance characteristics that are distinct from luminance characteristics of normal pixels as the defective pixel based on the parameters that are outside the allowable range.

Third Aspect: the parameters of the luminance characteristics include an offset defined as x-axis segments of the gamma curve, a gain defined as y-axis segments of the gamma curve, and a curvature of the gamma curve.

The analyzing of the luminance characteristics based on the measured luminance value of each of the pixels, which is obtained from the image data of the screen, to determine the luminance deviation and detecting the defective pixel further includes: determining the pixel in which each of the gain, the offset, and the curvature is within a corresponding allowable range, the pixel in which the curvature is within an allowable curvature range and the gain and the offset are respectively outside an allowable gain range and an allowable offset range, and the pixel in which the curvature and the gain are respectively within the allowable curvature range and the allowable gain range and the offset is outside the allowable offset range as the normal pixels; and separating the defective pixel into a contaminated pixel and a failed pixel based on the parameters that are outside the allowable range.

Fourth Aspect: the method further includes setting the allowable gain range to be compared with a measurement value of the gain, the allowable offset range to be compared with a measurement value of the offset, and the allowable curvature range to be compared with a measurement value of the curvature.

The analyzing of the luminance characteristics based on the measured luminance value of each of the pixels, which is obtained from the image data of the screen, to determine the luminance deviation and detecting the defective pixel includes: determining the pixel in which, among the gain, the offset, and the curvature, the gain is outside the allowable gain range and the offset and the curvature are respectively within the allowable offset range and the allowable curvature range as the contaminated pixel; and determining the pixel in which the curvature is outside the allowable curvature range and at least one of the gain and the offset is outside the corresponding allowable range as the failed pixel, and the failed pixel includes a dark spot pixel and a bright spot pixel, in which luminance is fixed regardless of gradation of the test pixel data.

Fifth Aspect: the method further includes: deriving the compensation data for each pixel for compensating for a luminance value of the defective pixel, which is calculated by an interpolation method, and the measured luminance value of each of other pixels except for the defective pixel; and storing the compensation data in a memory of a pixel driving circuit.

The removing of the measured luminance value or compensation data of the defective pixel, the luminance value of the defective pixel is interpolated by removing the measured luminance value of the defective pixel and calculating the luminance value of the defective pixel by an interpolation method using a measured luminance value of each of neighboring pixels of the defective pixel, or replacing the measured luminance value of the defective pixel with a preset specific value.

Sixth Aspect: the method further includes: deriving compensation data for compensating for the measured luminance value of each of the pixels by pixel; and storing the compensation data in a memory of a pixel driving circuit.

The removing of the measured luminance value or compensation data of the defective pixel, the compensation data of the defective pixel is interpolated by removing the compensation data of the defective pixel and calculating the compensation data of the defective pixel by an interpolation method using compensation data of each of neighboring pixels of the defective pixel, or replacing the compensation data of the defective pixel with a preset specific value.

Seventh Aspect: the removing of the measured luminance value or compensation data of the defective pixel further includes: calculating compensation data of the contaminated pixel by an interpolation method using compensation data of each of neighboring pixels of the contaminated pixel; and calculating compensation data of the failed pixel by an interpolation method using compensation data of each of neighboring pixels of the failed pixel or replacing the compensation data with zero.

Eighth Aspect: the method further includes: determining the luminance deviation between the pixels based on image data of the screen, which is obtained by capturing an image of the screen to which the compensation data is applied, and re-capturing an image of the screen by adjusting the compensation data at least one time until the luminance deviation is reduced within a preset allowable range; and updating the compensation data stored in the memory when the compensation data is adjusted.

Various aspects of the luminance deviation compensation device of the present disclosure will be described below.

First Aspect: the luminance deviation compensation device includes: a defective pixel detection unit configured to determine a luminance deviation by analyzing luminance characteristics based on a measured luminance value of each of the pixels, which is obtained from image data of the screen, and detect defective pixels; and a compensation unit configured to derive compensation data for each pixel for reducing the luminance deviation between the pixels and remove a measured luminance value or compensation data of the defective pixel.

Second Aspect: parameters of the luminance characteristics include an offset defined as x-axis segments of a gamma curve, a gain defined as y-axis segments of the gamma curve, and a curvature of the gamma curve, and the compensation unit is configured to: determine each of the pixel in which each of the gain, the offset, and the curvature is within a corresponding allowable range, the pixel in which the curvature is within an allowable curvature range and the gain and the offset are respectively outside an allowable gain range and an allowable offset range, and the pixel in which the curvature and the gain are respectively within the allowable curvature range and the allowable gain range and the offset is outside the allowable offset range as a normal pixel; and separate the defective pixel into a contaminated pixel and a failed pixel based on the parameters that are outside the allowable range.

Third Aspect: the compensation unit is configured to: determine the pixel in which, among the gain, the offset, and the curvature, the gain is outside the allowable gain range and the offset and the curvature are respectively within the allowable offset range and the allowable curvature range as the contaminated pixel; and determine the pixel in which the curvature is outside the allowable curvature range and at least one of the gain and the offset is outside the corresponding allowable range as the failed pixel.

Fourth Aspect: the compensation unit is configured to: interpolate a luminance value of the defective pixel by removing the measured luminance value of the defective pixel and calculating the luminance value of the defective pixel by an interpolation method using a measured luminance value of each of neighboring pixels of the defective pixel, or replacing the measured luminance value of the defective pixel with a preset specific value; derive compensation data for each pixel for compensating for a measured luminance value of each of other pixels except for the defective pixel and the luminance value of the defective pixel; and store the compensation data in a memory.

Fifth Aspect: the compensation unit is configured to: calculate a luminance value of the contaminated pixel by an interpolation method using a measured luminance value of each of neighboring pixels of the contaminated pixel; and calculate a luminance value of the failed pixel by an interpolation method using a measured luminance value of each of neighboring pixels of the failed pixel or replace the luminance value with zero.

Sixth Aspect: The luminance deviation compensation device of claim 11, wherein the compensation unit is configured to: derive compensation data for each pixel for compensating for the measured luminance value of each of the pixels; interpolate the compensation data of the defective pixel by removing the compensation data of the defective pixel and calculating the compensation data of the defective pixel by an interpolation method using compensation data of each of neighboring pixels of the defective pixel, or replacing the compensation data of the defective pixel with a preset specific value; and store the compensation data of each of the pixels in a memory.

Seventh Aspect: the compensation unit is configured to: interpolate compensation data of the contaminated pixel by an interpolation method using compensation data of each of neighboring pixels of the contaminated pixel; and calculate compensation data of the failed pixel by an interpolation method using compensation data of each of neighboring pixels of the failed pixel or replacing the compensation data of the failed pixel with zero.

Eighth Aspect: the compensation unit is configured to: determine the luminance deviation between the pixels based on image data of the screen, which is obtained by capturing an image of the screen to which the compensation data is applied; re-capture the image of the screen by adjusting the compensation data at least one time until the luminance deviation is reduced within a preset allowable range; and update the compensation data stored in the memory when the compensation data is adjusted.

Ninth Aspect: a compensation device is configured to: write test pixel data to the pixels disposed on the screen and capture an image of the screen first; write modulated pixel data obtained by modulating the pixel data with the compensation data, which is derived based on the measured luminance value of each of the pixels measured based on the first capturing result, to the pixels, and secondly capture an image of the screen; and further reduce a luminance deviation of the pixels by updating the compensation data based on the secondary capturing result, and the compensation device includes: a defective pixel detection unit configured to obtain luminance characteristics based on the measured luminance value of each of the pixels from image data of the screen output from the imaging device, and detect a defective pixel by analyzing the luminance characteristics of each of the pixels; and a compensation unit configured to derive the compensation data for each pixel, remove a measured luminance value or compensation data of the defective pixel, and interpolate the removed measured luminance value or compensation data of the defective pixel using data of neighboring pixels adjacent to the defective pixel or replace the compensation data with a preset specific value.

Various aspects of the display device of the present disclosure will be described below.

First Aspect: the display device includes a display panel including a screen in which pixels, on which an input image is reproduced, are disposed; a memory in which compensation data, which is derived as a result of capturing an image of the screen by a luminance deviation compensation device, is stored; a pixel driving unit configured to add the compensation data to pixel data of the input image and write the pixel data to the pixels; and a luminance deviation compensation device configured to: determine a luminance deviation by analyzing luminance characteristics based on a measured luminance value of each of the pixels, which is obtained from image data of the screen, and detect a defective pixel; derive compensation data for each pixel for reducing the luminance deviation between the pixels; remove a measured luminance value or compensation data of the defective pixel; and interpolate the removed measured luminance value or compensation data by an interpolation method using the defective pixel, or replace the compensation data with a specific value.

Second Aspect: the display device includes a pixel driving circuit configured to modulate pixel data of an input image using the compensation data stored in the memory.

The present disclosure can be achieved as computer-readable codes on a program-recoded medium. A computer-readable medium includes all kinds of recording devices that keep data that can be read by a computer system. For example, the computer-readable medium may be an HDD (Hard Disk Drive), an SSD (Solid State Disk), an SDD (Silicon Disk Drive), a ROM, a RAM, a CD-ROM, a magnetic tape, a floppy disk, and an optical data storage, and may also be implemented in a carrier wave type (for example, transmission using the internet). Accordingly, the detailed description should not be construed as being limited in all respects and should be construed as an example. The scope of the present disclosure should be determined by reasonable analysis of the claims and all changes within an equivalent range of the present disclosure is included in the scope of the present disclosure.

While the aspects of the present disclosure have been described in detail above with reference to the accompanying drawings, the present disclosure is not limited to the aspects, and various changes and modifications may be made without departing from the technical spirit of the present disclosure. Accordingly, the aspects disclosed herein are to be considered descriptive and not restrictive of the technical spirit of the present disclosure, and the scope of the technical spirit of the present disclosure is not limited by the aspects. Therefore, it should be understood that the above aspects are illustrative rather than restrictive in all respects. The scope of the disclosure should be construed by the appended claims, and all technical spirits within the scopes of their equivalents should be construed as being included in the scope of the disclosure.

What is claimed is:

1. A luminance deviation compensation method comprising:
    writing test pixel data to pixels on a screen of a display panel and capturing an image of the screen;
    measuring parameters for defining a gamma curve of luminance characteristics of each of the pixels based on a measured luminance value of each of the pixels;
    comparing a measurement value of each of the parameters with an allowable range for each parameter to determine whether the measurement value of each of the parameters exists within a corresponding preset allowable range;
    detecting the pixel including luminance characteristics that are distinct from the luminance characteristics of normal pixels as a defective pixel based on the parameters that are outside the allowable range;
    deriving compensation data for reducing the luminance deviation between the pixels for each pixel; and
    removing the measured luminance value or the compensation data of the defective pixel.

2. The luminance deviation compensation method of claim 1, wherein the luminance characteristics include parameters of an offset defined as x-axis segments of the gamma curve, a gain defined as y-axis segments of the gamma curve, and a curvature of the gamma curve, and
    wherein the detecting the pixel including luminance characteristics that are distinct from the luminance characteristics of normal pixels as a defective pixel based on the parameters that are outside the allowable range includes:
    determining the pixel in which each of the gain, the offset, and the curvature is within a corresponding allowable range, the pixel in which the curvature is within an allowable curvature range and the gain and the offset are respectively outside an allowable gain range and an allowable offset range, and the pixel in which the curvature and the gain are respectively within the allowable curvature range and the allowable gain range and the offset is outside the allowable offset range as the normal pixels; and
    separating the defective pixel into a contaminated pixel and a failed pixel based on the parameters that are outside the allowable range.

3. The luminance deviation compensation method of claim 2, further comprising setting the allowable gain range to be compared with the measurement value of the gain, the allowable offset range to be compared with the measurement value of the offset, and the allowable curvature range to be compared with the measurement value of the curvature,
    wherein the detecting the pixel including luminance characteristics that are distinct from the luminance characteristics of normal pixels as a defective pixel based on the parameters that are outside the allowable range includes:
    determining the pixel in which, among the gain, the offset, and the curvature, the gain is outside the allowable gain range and the offset and the curvature are respectively within the allowable offset range and the allowable curvature range as the contaminated pixel; and
    determining the pixel in which the curvature is outside the allowable curvature range and at least one of the gain and the offset is outside the corresponding allowable range as the failed pixel,
    wherein the failed pixel includes a dark spot pixel and a bright spot pixel, in which luminance is fixed regardless of gradation of the test pixel data.

4. The luminance deviation compensation method of claim 3, wherein the removing measured luminance value or compensation data of the defective pixel further includes:
    calculating compensation data of the contaminated pixel by an interpolation method using compensation data of each of neighboring pixels of the contaminated pixel; and
    calculating compensation data of the failed pixel by an interpolation method using compensation data of each of neighboring pixels of the failed pixel or replacing the compensation data with zero.

5. The luminance deviation compensation method of claim 1, further comprising:
    deriving the compensation data for each pixel for compensating for a luminance value of the defective pixel, which is calculated by an interpolation method, and the measured luminance value of each of other pixels except for the defective pixel; and storing the compensation data in a memory of a pixel driving circuit.

6. The luminance deviation compensation method of claim 5, wherein in the removing measured luminance value or compensation data of the defective pixel, the luminance value of the defective pixel is interpolated by removing the measured luminance value of the defective pixel and calculating the luminance value of the defective pixel by an interpolation method using a measured luminance value of each of neighboring pixels of the defective pixel, or replacing the measured luminance value of the defective pixel with a preset specific value.

7. The luminance deviation compensation method of claim 5, further comprising:

determining the luminance deviation between the pixels based on image data of the screen, which is obtained by capturing an image of the screen to which the compensation data is applied, and re-capturing an image of the screen by adjusting the compensation data at least one time until the luminance deviation is reduced within a preset allowable range; and updating the compensation data stored in the memory when the compensation data is adjusted.

8. The luminance deviation compensation method of claim 1, further comprising:

deriving compensation data for compensating for the measured luminance value of each of the pixels by pixel; and storing the compensation data in a memory of a pixel driving circuit, wherein in the removing measured luminance value or compensation data of the defective pixel, the compensation data of the defective pixel is interpolated by removing the compensation data of the defective pixel and calculating the compensation data of the defective pixel by an interpolation method using compensation data of each of neighboring pixels of the defective pixel, or replacing the compensation data of the defective pixel with a preset specific value.

9. A luminance deviation compensation device including a compensation device configured to write test pixel data to pixels disposed on a screen of a display panel and capture an image of the screen using an imaging device, wherein the compensation device comprises:

a defective pixel detection unit configured to determine a luminance deviation by analyzing luminance characteristics based on a measured luminance value of each of the pixels, which is obtained from image data of the screen, and detect defective pixels; and a compensation unit configured to derive compensation data for each pixel for reducing the luminance deviation between the pixels and remove a measured luminance value or compensation data of the defective pixel, wherein the luminance characteristics include parameters of an offset defined as x-axis segments of a gamma curve, a gain defined as y-axis segments of the gamma curve, and a curvature of the gamma curve, and wherein the compensation unit is configured to:

determine each of the pixel in which each of the gain, the offset, and the curvature is within a corresponding allowable range, the pixel in which the curvature is within an allowable curvature range and the gain and the offset are respectively outside an allowable gain range and an allowable offset range, and the pixel in which the curvature and the gain are respectively within the allowable curvature range and the allowable gain range and the offset is outside the allowable offset range as a normal pixel; and separate the defective pixel into a contaminated pixel and a failed pixel based on the parameters that are outside the allowable range.

10. The luminance deviation compensation device of claim 9, wherein the compensation unit is configured to:

determine the pixel in which, among the gain, the offset, and the curvature, the gain is outside the allowable gain range and the offset and the curvature are respectively within the allowable offset range and the allowable curvature range as the contaminated pixel; and determine the pixel in which the curvature is outside the allowable curvature range and at least one of the gain and the offset is outside the corresponding allowable range as the failed pixel.

11. The luminance deviation compensation device of claim 10, wherein the compensation unit is configured to:

interpolate a luminance value of the defective pixel by removing the measured luminance value of the defective pixel and calculating the luminance value of the defective pixel by an interpolation method using a measured luminance value of each of neighboring pixels of the defective pixel, or replacing the measured luminance value of the defective pixel with a preset specific value;

derive compensation data for each pixel for compensating for a measured luminance value of each of other pixels except for the defective pixel and the luminance value of the defective pixel; and store the compensation data in a memory.

12. The luminance deviation compensation device of claim 11, wherein the compensation unit is configured to:

determine the luminance deviation between the pixels based on image data of the screen, which is obtained by capturing an image of the screen to which the compensation data is applied;

re-capture the image of the screen by adjusting the compensation data at least one time until the luminance deviation is reduced within a preset allowable range; and update the compensation data stored in the memory when the compensation data is adjusted.

13. The luminance deviation compensation device of claim 10, wherein the compensation unit is configured to:

calculate a luminance value of the contaminated pixel by an interpolation method using a measured luminance value of each of neighboring pixels of the contaminated pixel; and calculate a luminance value of the failed pixel by an interpolation method using a measured luminance value of each of neighboring pixels of the failed pixel or replace the luminance value with zero.

14. The luminance deviation compensation device of claim 10, wherein the compensation unit is configured to:

derive compensation data for each pixel for compensating for the measured luminance value of each of the pixels;

interpolate the compensation data of the defective pixel by removing the compensation data of the defective pixel and calculating the compensation data of the defective pixel by an interpolation method using compensation data of each of neighboring pixels of the defective pixel, or replacing the compensation data of the defective pixel with a preset specific value; and store the compensation data of each of the pixels in a memory.

15. The luminance deviation compensation device of claim 10, wherein the compensation unit is configured to:
   interpolate compensation data of the contaminated pixel by an interpolation method using compensation data of each of neighboring pixels of the contaminated pixel; and
   calculate compensation data of the failed pixel by an interpolation method using compensation data of each of neighboring pixels of the failed pixel or replacing the compensation data of the failed pixel with zero.

16. A luminance deviation compensation device comprising a compensation device configured to obtain a measured luminance value of each of pixels by capturing an image of a screen of a display panel using an imaging device, and derive compensation data for compensating for the measured luminance value for each pixel,
   wherein the compensation device is configured to:
   write test pixel data to the pixels disposed on the screen and capture an image of the screen first;
   write modulated pixel data obtained by modulating the pixel data with the compensation data, which is derived based on the measured luminance value of each of the pixels measured based on the first capturing result, to the pixels, and secondly capture an image of the screen; and
   further reduce a luminance deviation of the pixels by updating the compensation data based on the secondary capturing result, and
   the compensation device includes:
   a defective pixel detection unit configured to measure parameters for defining a gamma curve of luminance characteristics of each of the pixels based on a measured luminance value of each of the pixels, compare a measurement value of each of the parameters with an allowable range for each parameter to determine whether the measurement value of each of the parameters exists within a corresponding preset allowable range, and detect the pixel having luminance characteristics that are distinct from the luminance characteristics of normal pixels as a defective pixel based on the parameters that are outside the allowable range; and
   a compensation unit configured to derive the compensation data for each pixel, remove a measured luminance value or compensation data of the defective pixel, and interpolate the removed measured luminance value or compensation data of the defective pixel using data of neighboring pixels adjacent to the defective pixel or replace the compensation data with a preset specific value.

17. A display device comprising:
   a display panel including a screen in which pixels, on which an input image is reproduced, are disposed;
   a memory in which compensation data, which is derived as a result of capturing an image of the screen by a luminance deviation compensation device, is stored;
   a pixel driving unit configured to add the compensation data to pixel data of the input image and write the pixel data to the pixels; and
   a luminance deviation compensation device configured to:
   measure parameters for defining a gamma curve of luminance characteristics of each of the pixels based on a measured luminance value of each of the pixels;
   compare a measurement value of each of the parameters with an allowable range for each parameter to determine whether the measurement value of each of the parameters exists within a corresponding preset allowable range; and
   detect the pixel having luminance characteristics that are distinct from the luminance characteristics of normal pixels as a defective pixel based on the parameters that are outside the allowable range;
   derive compensation data for each pixel for reducing the luminance deviation between the pixels;
   remove a measured luminance value or compensation data of the defective pixel; and
   interpolate the removed measured luminance value or compensation data by an interpolation method using the defective pixel, or replace the compensation data with a specific value.

18. The display device of claim 17, further comprising a pixel driving circuit configured to modulate pixel data of an input image using the compensation data stored in the memory.

* * * * *